US012101035B2

(12) United States Patent
Schaffarra

(10) Patent No.: US 12,101,035 B2
(45) Date of Patent: Sep. 24, 2024

(54) SYSTEM WITH MULTIPLE POWER CONTROLLERS TO REDUCE HARMONICS

(71) Applicant: Advanced Energy Industries, Inc., Denver, CO (US)

(72) Inventor: Christian Schaffarra, Ruthen (DE)

(73) Assignee: Advanced Energy Industries, Inc., Denver, CO (US)

( * ) Notice: Subject to any disclaimer, the term of this patent is extended or adjusted under 35 U.S.C. 154(b) by 0 days.

(21) Appl. No.: 18/114,090

(22) Filed: Feb. 24, 2023

(65) Prior Publication Data

US 2024/0291392 A1    Aug. 29, 2024

(51) Int. Cl.
*H02M 5/27*    (2006.01)
*H02M 1/00*    (2006.01)
*H02M 5/293*    (2006.01)
*H02M 5/297*    (2006.01)
*H02M 7/217*    (2006.01)

(52) U.S. Cl.
CPC ......... *H02M 5/293* (2013.01); *H02M 1/0067* (2021.05)

(58) Field of Classification Search
CPC ...... H02M 5/293; H02M 1/0067; H02M 5/27; H02M 5/297; H02M 7/217
USPC .......................................................... 307/31
See application file for complete search history.

(56) References Cited

U.S. PATENT DOCUMENTS 6,621,721 B2 *  9/2003  York ..................... H02M 7/217
                                                                363/71

FOREIGN PATENT DOCUMENTS

EP         3278191 A      2/2018
WO     2023022660 A1      2/2023

OTHER PUBLICATIONS

Al Roman; Al Heilgenstein, SCR Power Theory—Training Manual, Chromalox, Inc., Jan. 2002.
EPO, Extended European Search Report issued in Application No. 24159244.3, Jul. 10, 2024, 8 pages, Published in: EP.

* cited by examiner

*Primary Examiner* — Rexford N Barnie
*Assistant Examiner* — Xuan Ly
(74) *Attorney, Agent, or Firm* — Neugeboren O'Dowd PC

(57) ABSTRACT

A power controller system comprises multiple power controllers that receive a periodic waveform input and that apply power to multiple loads. A switch-on time and a switch-off time is for each of the power controllers within a cycle of the periodic waveform input. The power controllers generate output waveforms to be applied to the loads that are partial segments of the cycle of the periodic waveform input. Each of the power controllers includes a switchable power component that can be switched on and switched off at any time and that can conduct current in both forward and reverse directions.

13 Claims, 15 Drawing Sheets

SYSTEM WITH MULTIPLE POWER CONTROLLERS TO REDUCE HARMONICS

BACKGROUND

Field

This disclosure relates generally to power controllers, and more particularly to a power controller system that reduces harmonics using multiple power controllers having staggered switch-on and switch-off times within a cycle of a periodic waveform.

Background

In today's competitive and cost-conscious industrial landscape, semiconductor and general manufacturing industries need a reliable, flexible, and precise way to control power in processes such as electric heating. Thyristor or silicon-controlled rectifier (SCR) power controllers have often been used for this purpose. Thyristor power controllers are fast responding devices that can handle high current loads and precisely control the amount of power applied to loads such as electric heaters.

A thyristor (sometimes referred to as a silicon-controlled rectifier (SCR)) is a four-layer (P—N—P—N) semiconductor device that behaves like a rectifying diode. Current flows through the thyristor in one direction but not in the opposite direction. The thyristor has an added feature of controllability in that, based on a control signal applied to its gate, it can conduct OR block current in one direction, but always blocks current flow in the opposite direction. Thyristors are commonly used in power controllers because they can switch large amounts of current quickly with a relatively small gate signal. Once a thyristor is triggered or turned on (or "fired"), it remains on until the current conducted by the thyristor falls to zero. Thyristors are useful for controlling power flow in AC circuits and particularly in applications where power must be varied and converted into thermal energy. They may be used, for example, to control the power flow to electric heaters, such as electric ovens or water heaters, and to control the power flow in industrial processes, such as in furnace or smelter control.

Thyristor power controllers, while useful for providing tight and accurate power control, have a drawback in that harmonics are sometimes generated that may interfere with the operation of other devices in the facility and may preclude use of the power controller at all due to the harmonics created. In addition, while thyristors can be switched on at any time to conduct current, they cannot be switched off and continue conducting current until the current level falls to zero.

SUMMARY

One aspect of this disclosure may be characterized as a power controller system comprising multiple power controllers that receives a periodic waveform input and applies power to multiple loads. The power controller system sets a switch-on time and a switch-off time for each of the power controllers within a cycle of the periodic waveform input, such that the power controllers generate output waveforms that are partial segments of the cycle of the periodic waveform input. The cycle of the periodic waveform input may be, for example, a sinusoidal mains period of a commercial or residential power system.

In one implementation, each of the power controllers comprises a switchable power component configured to be switched on or off at any time and configured to conduct current in both forward and reverse directions when switched on.

In a further implementation, each of the power controllers comprises a first switchable power component paired with a first diode for conducting current in a forward direction, and a second switchable power component paired with a second diode for conducting current in a reverse direction. The switchable power components may be, for example, bipolar junction transistors (BJTs) or metal-oxide-semiconductor field-effect transistors (MOSFETs).

In a further implementation, the control circuitry staggers the switch-on and switch-off times such that the power controllers turn on and turn off in sequence within the cycle of the periodic waveform input.

In a further implementation, the output waveforms of the power controllers are summed to form a summed output waveform, and the summed output waveform corresponds to the sinusoidal waveform of the alternating current input. The control circuitry may optimize the switch-on and switch-off times of the power controllers by using the summed output waveform as feedback.

In a further implementation, the loads are ohmic-inductive loads, and the control circuitry shifts the switch-on and/or switch-off times of the power controllers to avoid spikes in the summed output waveform.

In a further implementation, the control circuitry is configured as a processor that is a separate component from the power controllers. In an alternative implementation, the power controllers are connected, and the control circuitry is configured within the power controllers.

Another aspect of this disclosure may be characterized as a power controller control method. The method comprises providing multiple power controllers that apply power to multiple loads; applying a periodic waveform input to the power controllers; setting switch-on and switch-off times for each power controller within a cycle of the periodic waveform input; and generating output waveforms from the power controllers that are partial segments of the cycle of the periodic waveform input.

In one implementation, the method staggers the switch-on and switch-off times such that the power controllers turn on and turn off in sequence within the cycle of the periodic waveform input. The switch-on and switch-off times may be staggered, for example, such that each of the power controllers is switched on for 600 of each half-cycle of the periodic waveform input.

In a further implementation, the output waveforms of the power controllers are summed to form a summed output waveform that corresponds to the periodic waveform input. The switch-on and switch-off times may be optimized by using the summed output waveform as feedback.

In a further implementation, the loads are ohmic-inductive loads, and the switch-on and/or switch-off times of the power controllers are shifted to avoid spikes in the summed output waveform.

A further aspect of this disclosure may be characterized as a power controller system comprising multiple power controllers that receive a periodic waveform input and apply power to multiple loads. The system also comprises means for setting a switch-on time and a switch-off time for each of the power controllers within a cycle of the periodic waveform input, such that the power controllers generate output waveforms that are partial segments of the cycle of the periodic waveform input.

In one implementation, each of the power controllers comprises first switchable means for conducting current in a forward direction and second switchable means for conducting current in a reverse direction. The first switchable means may be a first switchable power component paired with a first diode for conducting current in a forward direction, and the second switchable means may be a second switchable power component paired with a second diode for conducting current in a reverse direction.

In a further implementation, means for staggering the switch-on and switch-off times are provided such that the power controllers are turned on and turned off in sequence within the cycle of the periodic waveform input.

Further aspects of this disclosure are depicted in the accompanying drawings and description and will be apparent based thereon.

BRIEF DESCRIPTION OF THE DRAWINGS

The drawings accompanying this disclosure are not necessarily to scale; emphasis is instead placed on illustrating the concepts disclosed herein. Like reference characters may refer to the same parts throughout the drawings. The drawings depict only illustrative examples of this disclosure and are not limiting in scope.

DETAILED DESCRIPTION

The word "exemplary" is used herein to mean "serving as an example, instance, or illustration." Embodiments described herein as "exemplary" should not be construed as preferred or advantageous over other embodiments and are not intended to be exhaustive or to limit the description to the precise form disclosed.

Figure 1:
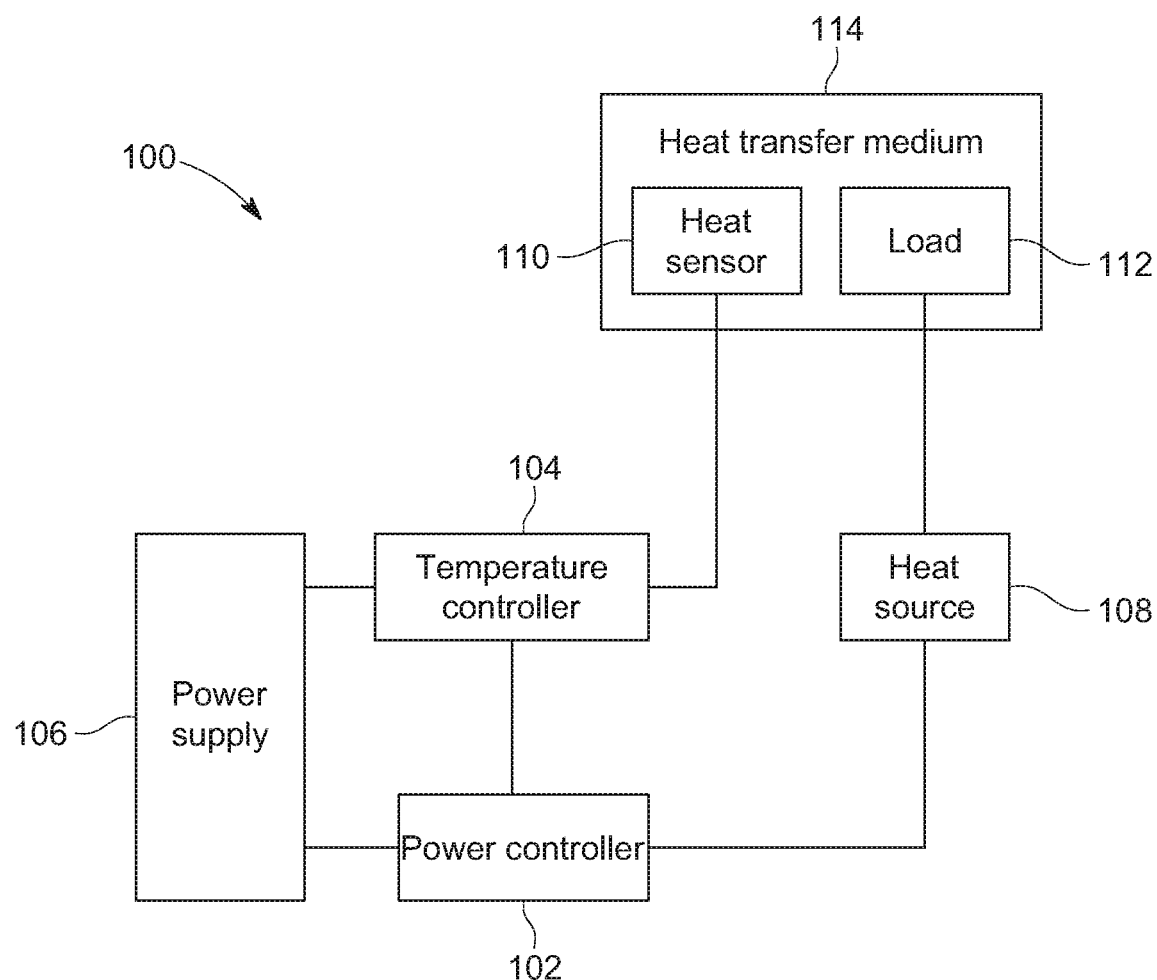
FIG. 1 is a conceptual block diagram of an exemplary thermal system controlled by a thyristor power controller, in accordance with aspects of this invention.

FIG. 1 is a conceptual block diagram of an exemplary thermal system 100 controlled by a power controller 102, in accordance with aspects of this invention. In system 100, load 112 is heated by heat source 108 that is controlled by power controller 102. Heat sensor 110 measures the temperature of load 112 via heat transfer medium 114, which may be for example the inside of a furnace. The output of sensor 110 is fed to temperature controller 104, which compares the temperature to a setpoint and outputs a control signal to power controller 102. If the temperature is below the setpoint, the control signal causes power controller 102 to deliver more power from power supply 106 to heat source 108 and load 112, and if the temperature is above the setpoint, the control signal causes power controller 102 to deliver less power from power supply 106 to heat source 108 and load 112.

Power controller 102 is sometimes implemented as a thyristor power controller. Thyristors are fast responding devices that can handle high current loads and precisely control the amount of power applied to loads such as electric heaters In a thyristor power controller, since a thyristor conducts current in only one direction, two thyristors are required to fully conduct the bi-directional flow of alternating current. In particular, one thyristor for conducting current in one direction and another thyristor for conducting current in an opposite direction may be connected in parallel but opposite directions, sometimes referred to as a "back-to-back" configuration.

Figure 2A:
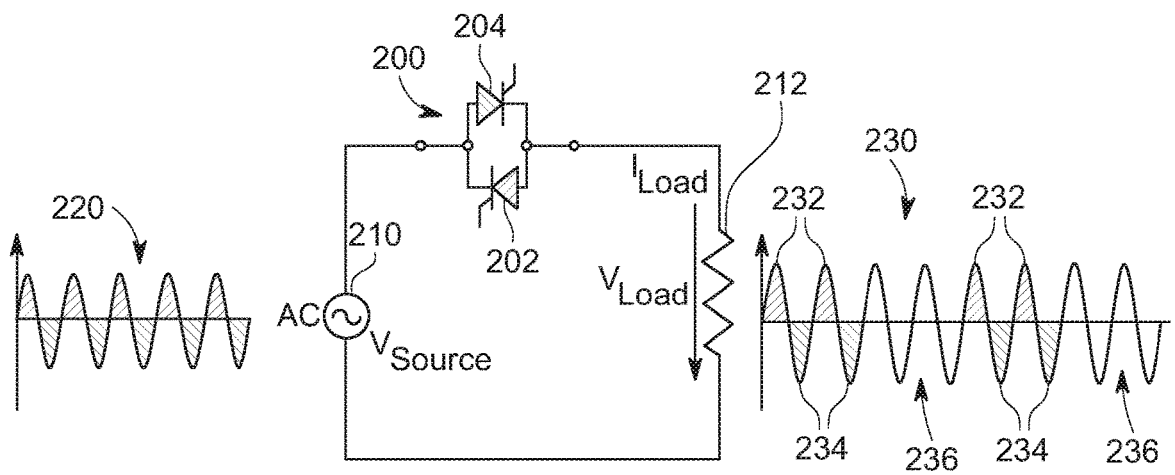
FIG. 2A is a conceptual circuit diagram of an exemplary thyristor power controller in a zero-crossing or burst firing mode, in accordance with aspects of this disclosure.
Figure 2B:
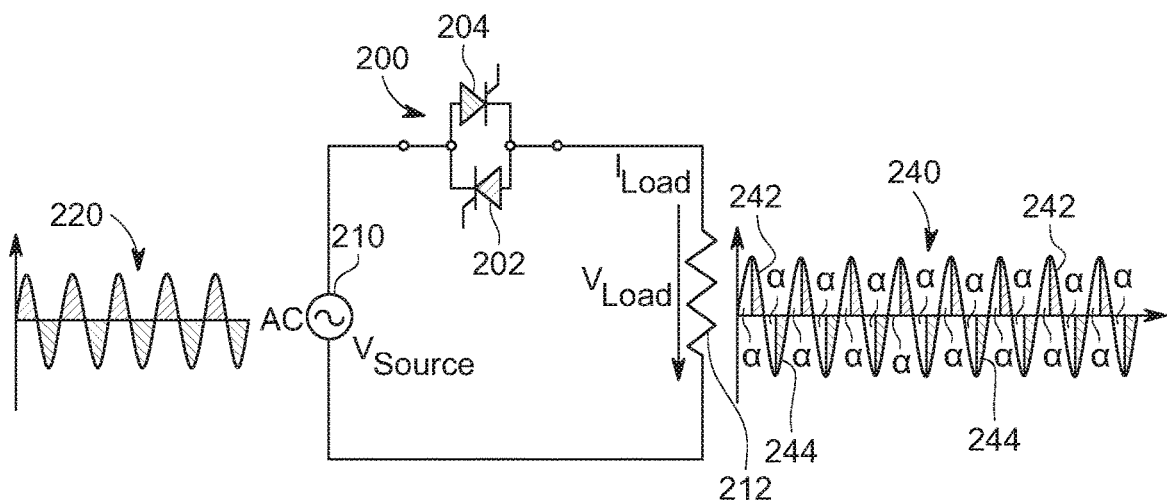
FIG. 2B is a conceptual circuit diagram of an exemplary thyristor power controller in a phase angle firing mode, in accordance with aspects of this disclosure.

FIGS. 2A-2B are conceptual circuit diagrams of an exemplary thyristor power controller 200 for conducting current generated by an AC voltage source 210, in accordance with aspects of this disclosure. AC voltage source 210 generates alternating current (AC) by periodically reversing the direction of the voltage, which causes the current to also change direction periodically, creating an oscillating current flow. The oscillating current flow generated by AC voltage source 210 has a periodic waveform profile 220 (such as a sine wave, for example and without limitation) comprised of positive and negative half-cycles. Thyristor power controller 200 includes thyristor 202 for conducting current in a forward direction (the positive half-cycles of the periodic waveform profile 220) and thyristor 204 for conducting current in a reverse direction (the negative half-cycles of the periodic waveform profile 220) through load 212.

The power delivered to load 212 by thyristor power controller 200 can be regulated by using various control or firing modes. One type of firing mode, illustrated in FIG. 2A, is a zero-crossing or burst firing mode. In zero-crossing firing mode, thyristors 202 and 204 are triggered only when the voltage across the thyristor is zero (i.e., only at zero crossings of the periodic waveform profile 220). Once a thyristor is triggered by a gate signal, it remains on until the conducted current falls to zero, which occurs every half-cycle in an AC waveform. When thyristor 202 is triggered, it conducts current in a forward direction to form the positive half-cycle 232 of output waveform 230, and when thyristor 204 is triggered, it conducts current in a reverse direction to form the negative half-cycle 234 of output waveform 230. In zero-crossing firing mode, both thyristors 202, 204 are periodically turned off (not triggered) to create multiple-cycle periods 236 in output waveform 230 during which no current at all is output to load 212.

Zero crossing firing mode effectively creates a series of pulses of alternating current that flow to load 212, rather than a steady flow of current. Rather than conducting every cycle of the current waveform into the load (i.e., a heater) only the number of cycles needed to support the load (i.e., the required amount of heat) are conducted. In the example of FIG. 2A, load 212 requires only 50% of the power output of AC source 210. Thus, power controller 200 conducts 100% of the current output of AC source 210 current to load 212 for two of every four cycles and conducts 0% of the current output of AC source 210 for the other two of four cycles.

Zero-crossing firing mode is advantageous in that, since the thyristors are triggered only at zero crossings, less electromagnetic interference and fewer harmonics are generated. However, there are disadvantages in that the load temperature can vary considerably between on-off cycles, which can shorten the life of heater elements and decrease the ability to obtain precise power control.

An alternative to a zero-crossing firing mode is a phase-angle firing mode, which is illustrated in FIG. 2B. Phase-angle firing dissects individual AC cycles into smaller segments, resulting in extremely tight and accurate control, and can be used on many types of loads. In phase-angle firing mode, thyristors 202, 204 are triggered at a point other than the zero crossing of the AC waveform. Each thyristor 202, 204 conducts current only for a selected variable segment of its half-cycle, and power can be regulated by selecting the point (phase-angle) at which the thyristor is triggered within its half-cycle. Thyristor 202 is triggered at a selected phase angle and only conducts forward current for the remaining portion 242 of each positive half-cycle of output waveform 240, and thyristor 204 is triggered at a selected phase angle and only conducts reverse current for the remaining portion 244 of each negative half-cycle of output waveform 240.

Rather than creating a series of pulses, as in zero-crossing mode where multiple cycles may pass in which no current at all is conducted to the load, phase-angle firing mode conducts some portion of the current generated by AC source 210 in every half-cycle as determined by the phase-angle setting. Like FIG. 2A, FIG. 2B illustrates an example in which load 212 requires only 50% of the power output of AC source 210. However, the phase-angle firing mode of FIG. 2A accomplishes this by setting the phase-angle such that 50% of the current is conducted in each positive and in each negative half-cycle, rather than conducting 100% of the current for two of every four cycles and conducting 0% of the current for the other two cycles, as in zero-crossing mode.

Phase-angle firing mode is advantageous in that it provides for a very fine resolution of the power delivered to load 212. In addition, phase-angle control is suitable for handling most types of loads, including transformer-coupled or inductive loads. However, there is a trade-off in that, since the thyristors are triggered or switched on at points other than the zero crossing, harmonics are generated by the switching operation that may cause overheating, radio frequency interference, and possibly affect the operation of nearby equipment. Moreover, once the thyristor is switched on, it cannot be switched off and remains on until the conducted current falls to zero.

Harmonics are unwanted higher frequencies that are typically caused by non-linear loads that distort the waveform of the current or voltage. Harmonics are created at integer multiples of the fundamental frequency of the waveform. Phase angle firing creates harmonics because it involves switching the thyristor on at a specific point in the AC waveform, rather than at the zero-crossing point. When the thyristor is switched on at a point other than the zero crossing, the current waveform is not in phase with the voltage waveform and causes non-linearity in the circuit and harmonic distortion. The degree of harmonic distortion depends on the phase angle at which the thyristor is switched on.

Figure 2C:
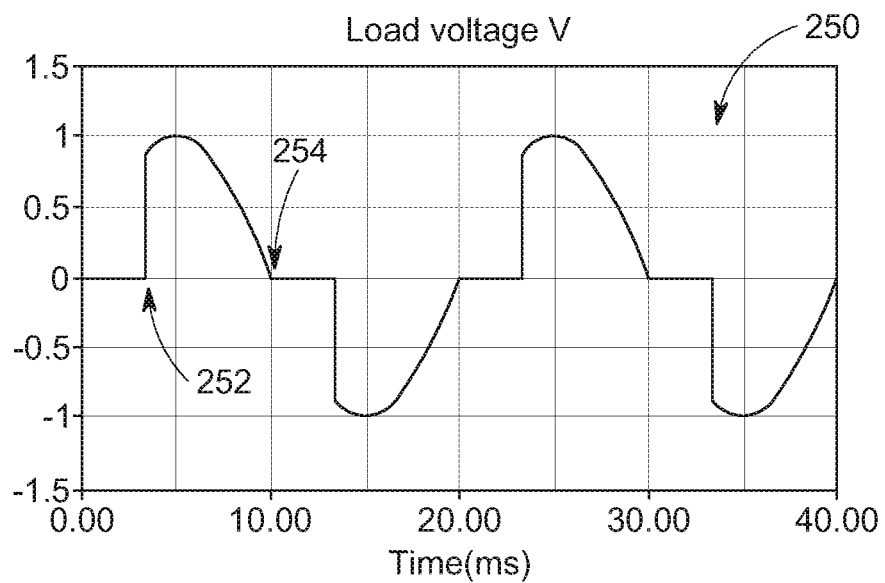
FIG. 2C is a graph showing an exemplary load voltage waveform generated by a thyristor power controller in a phase angle firing mode, in accordance with aspects of this disclosure.
Figure 2D:
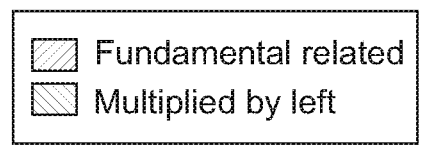
FIG. 2D is a graph showing the harmonic spectrum for the exemplary waveform of FIG. 2C, in accordance with aspects of this disclosure.
Figure 2D:
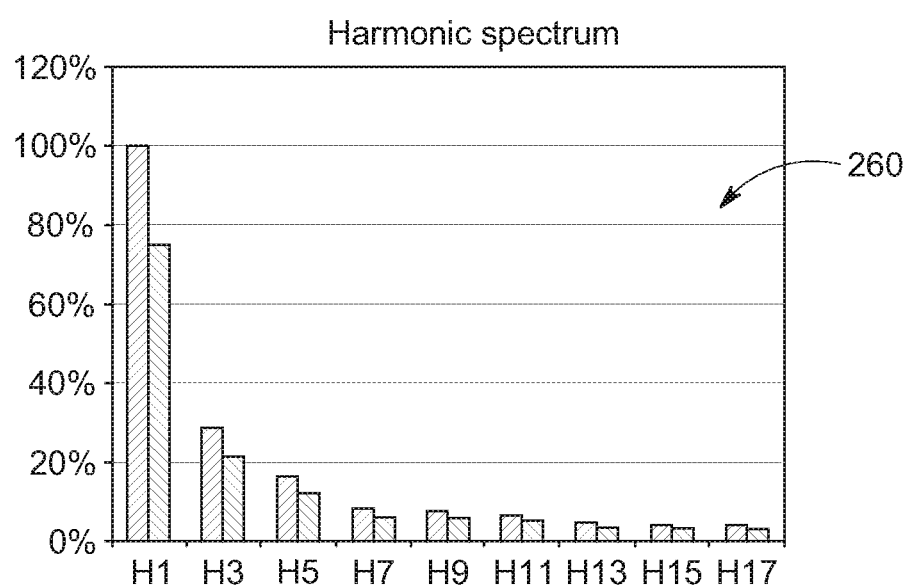

FIGS. 2C-2D illustrate the harmonic distortion associated with phase angle firing in a thyristor power controller. FIG. 2C is a graph showing an exemplary load voltage waveform 250 generated by a thyristor power controller in phase angle firing mode, such as thyristor power controller 200 of FIG. 2B. The thyristor power controller fires at a phase angle of about sixty degrees to produce waveform 250 of FIG. 2C. The forward conducting thyristor (i.e., thyristor 202) fires or is triggered at time 252 (about 3 ms) in the positive half of the first cycle of waveform 250 and conducts forward current for the remainder of the positive half-cycle, and the reverse conducting thyristor (i.e., thyristor 204) fires or is triggered at time 254 in the negative half of the first cycle of waveform 250 and conducts reverse current for the remainder of the negative half-cycle. The second and following cycles of waveform 250 are formed in the same manner, to produce periodic waveform 250 of FIG. 2C.

As described above, when the thyristors are fired at points in the waveform other than the zero crossing, as in FIG. 2C, the current waveform is not in phase with the voltage waveform and causes non-linearity and harmonic distortion. FIG. 2D is a graph 260 showing the harmonic spectrum for the exemplary waveform 250 of FIG. 2C, which is formed by phase angle firing at a phase angle of sixty degrees. In FIG. 2D, on the horizontal axis, H1 is the fundamental frequency, and H3, H5 . . . H17 are harmonics at odd multiples of the fundamental frequency. In other words, H3 is the third harmonic, H5 is the fifth harmonic, and so on. The vertical axis shows the harmonic ratio (percentage) for each harmonic, which is the amplitude of a specific harmonic frequency divided by the amplitude of the fundamental frequency.

For each harmonic in FIG. 2D, the left column is the harmonic ratio of that harmonic. For H1, which is the fundamental frequency, the left column is 100% since the fundamental frequency and first harmonic are equal. The harmonic ratio at the third harmonic is about 28%, meaning that the amplitude of the third harmonic frequency is about 28% of the amplitude of the fundamental frequency. The fifth harmonic ratio is about 16%, and the harmonic ratios continue to decrease for each harmonic thereafter. The right column for each harmonic in FIG. 2D is the harmonic ratio multiplied by the effective current Ieff, which is a measure of the total harmonic current that flows in the circuit. Multiplying the harmonic ratio by the effective current Ieff provides the actual current amplitude at that specific harmonic frequency, which is useful in determining the potential impact of harmonic distortion on equipment and power systems.

The harmonic spectrum (FIG. 2D) resulting from a typical waveform formed by phase angle firing (FIG. 2C) is problematic. It may interfere with the operation of other devices in the facility and may even preclude use of the power controller at all due to the harmonics created. A power controller is needed that can provide the very fine resolution of power control made possible by dissecting individual waveform cycles into smaller segments, but without the harmonics associated with phase angle firing in a thyristor power controller.

Figure 3:
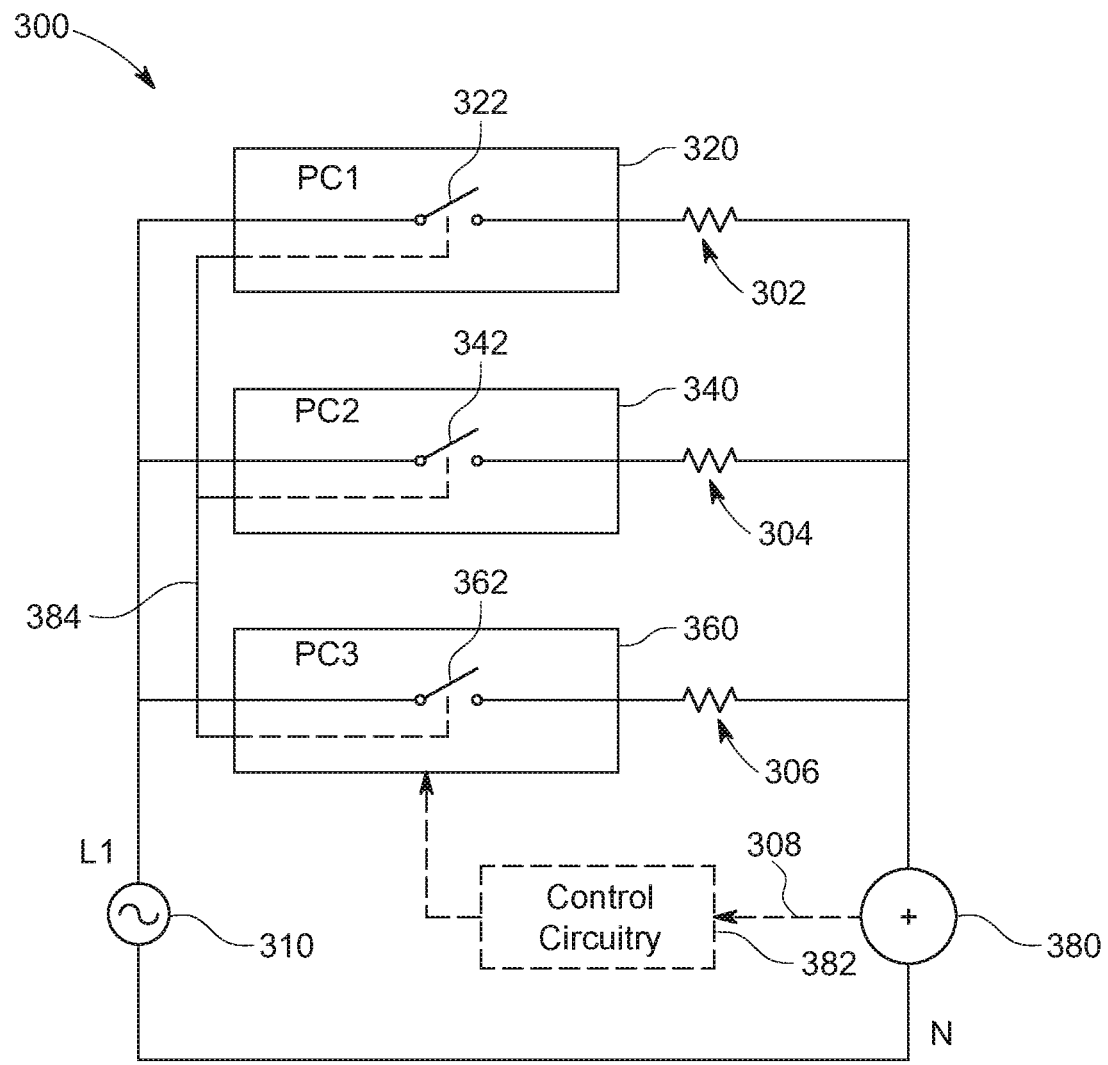
FIG. 3 is a conceptual diagram of an exemplary power controller system having multiple power controllers for controlling power supplied to multiple ohmic loads, in accordance with aspects of this disclosure.
Figure 4A:
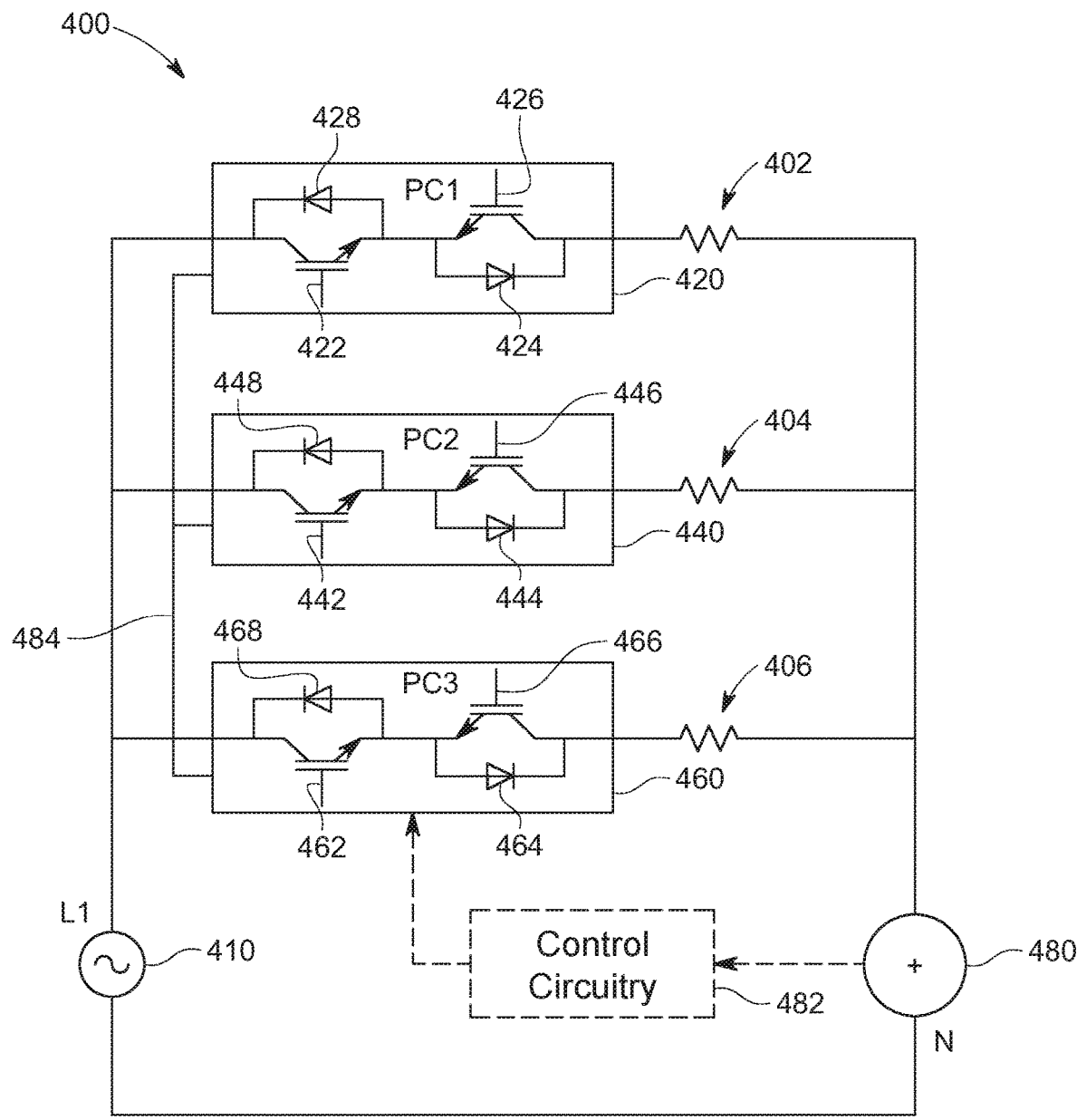
FIG. 4A is a conceptual diagram of an exemplary power controller system having multiple power controllers for controlling power supplied to multiple ohmic loads, in accordance with aspects of this disclosure.

FIG. 3 is a conceptual diagram of an exemplary power controller system 300 having multiple power controllers for controlling power supplied to multiple loads, in accordance with aspects of this disclosure. Power controller system 300 may be implemented in exemplary thermal system 100 of FIG. 1, for example, in the place of power controller 102. In FIG. 3, for non-limiting purposes of illustration, three power controllers 320, 340, 360 are shown that respectively control the power applied to three ohmic loads 302, 304, 306. In this regard, FIG. 4A is merely one illustrative example of a power controller system; power controller system 300 may comprise many other numbers of power controllers controlling many other numbers of loads.

As described above, power controller system 300 applies power to ohmic loads, also referred to as resistive loads. An ohmic load has a constant resistance and exhibits a linear relationship between current and voltage, i.e., the resistance does not change with changes in the applied voltage or current. Some non-limiting examples of ohmic loads include resistors, electric heaters, and incandescent light bulbs.

Power controller system 300 is configured to conduct alternating current generated by a periodic voltage source 310. Periodic voltage source 310 generates alternating current (AC) by periodically reversing the direction of the voltage, which causes the current to also change direction periodically, creating an oscillating current flow. In one implementation, the oscillating current flow generated by voltage source 310 has a sinusoidal waveform profile comprised of repeating cycles or periods, with each cycle having a positive half-cycle and a negative half-cycle. One cycle of the sinusoidal waveform generated by voltage source 310 may be, for example, a mains period of a residential or commercial power system. The line between AC voltage source 310 and power controllers 320, 340, 360 may be the L1 line.

As described above, voltage source 310 generates a periodic waveform. While this disclosure often describes the periodic waveform generated by voltage source 310 as a sinusoidal waveform, the periodic waveform could have other shapes. The periodic waveform could be, for example, a square waveform, a triangle waveform, or any other suitably shaped periodic waveform.

Each power controller of system 300 includes switchable power components that can be switched on and switched off at any time. This contrasts with the thyristor power controllers described above that can only be switched on and then remain on until the current conducted by the thyristor falls to zero. In their most fundamental form, as illustrated in FIG. 3, each power controller comprises a switchable power component that can be switched on or off at any time and that can conduct current in a forward or reverse direction when switched on. First power controller 320 includes switchable power component 322 that can be switched on or off at any time and that can conduct current in a forward or reverse direction when switched on. Likewise, second power controller 340 includes switchable power component 342 and third power controller 360 includes switchable power component 362.

The switchable power components of power controllers 320, 340, 360 may be any suitable power component that can be switched on to allow the flow of current through the device and switched off to prevent the flow of current through the device. In one implementation, the switchable power components may be current-controlled devices such as bipolar junction transistors (BJTs) that are switched on by applying a small current to the base terminal to allow current to flow between the emitter and collector and that are switched off by removing the base terminal current. Alternatively, the switchable power components may be voltage-controlled devices such as metal-oxide-semiconductor field-effect transistors (MOSFETs) that are switched on by applying a voltage to the gate terminal to allow current to flow between the source and the drain and that are switched off by removing the gate terminal voltage.

The switchable power components within each of power controllers 320, 340, 360 are configured to switch on and switch off at predetermined times within a cycle of the periodic waveform provided by voltage source 310, such that each power controller outputs a partial segment of the cycle of the periodic waveform. That is, power controllers 320, 340, 360 are configured to switch on and switch off at predetermined phase angles of the periodic waveform. Thus, each power controller uses only a partial segment of the periodic waveform, and these partial segments are interleaved in time, as will be graphically depicted, and described below. Ideally, the output waveforms of power controllers 320, 340, 360 (which are applied individually to ohmic loads 302, 304, 306), when summed at 380, should be approximately equal to the input periodic waveform. As shown, the summed output waveform at the summed output 380 may optionally be used as feedback 308 for the control circuitry 382. The feedback 308 may be one or more of voltage, current, and phase information provided by sensing technology known in the art such as voltage sensors, current sensors, voltage-current (VI) sensors and directional couplers. Feedback 308 may also optionally be incorporated into the implementations described with reference to FIGS. 4A and 5A.

Control of the switch-on and switch-off times of the power controllers may be carried out by a separate device, such as control circuitry 382 (which may be a processor or other hardware). Control circuitry 382 may optimize the switch-on and switch-off times so that the combined output of the power controllers is a complete periodic waveform with minimal harmonics, spikes, or other disturbances. In this regard, the summed outputs 380 of power controllers 320, 340, 360 may be fed back (by feedback 308) to control circuitry 382 to further optimize the switch-on and switch-off times of the power controllers. Alternatively, provided there is a connection 384 between power controllers 320, 340, 360, the switch-on and switch-off times may be controlled by control circuitry within the power controllers themselves without the need for a separate component such as control circuitry 382.

Figure 4B:
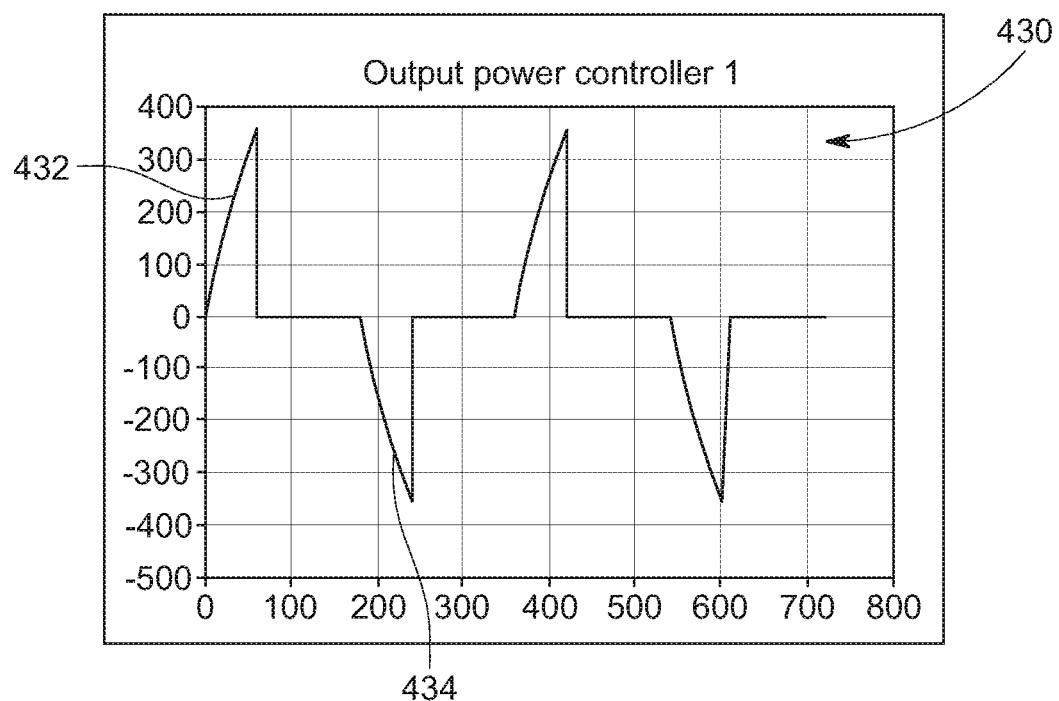
FIG. 4B illustrates graphs showing exemplary output waveforms of the power controllers of the power controller system of FIG. 4A, in accordance with aspects of this disclosure.
Figure 4B:
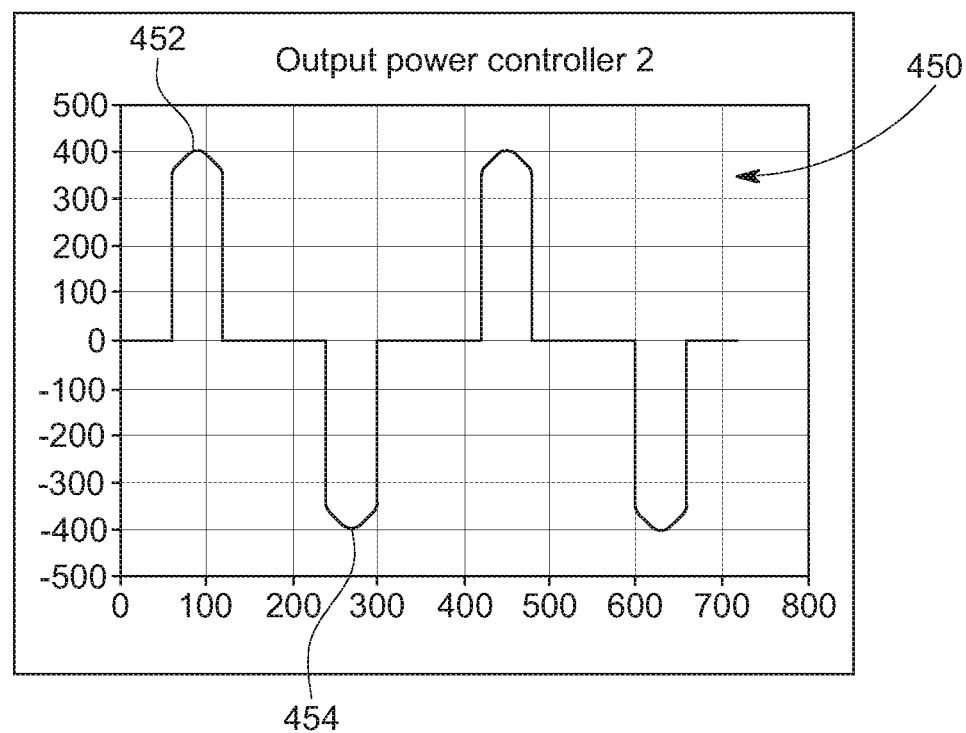
Figure 4C:
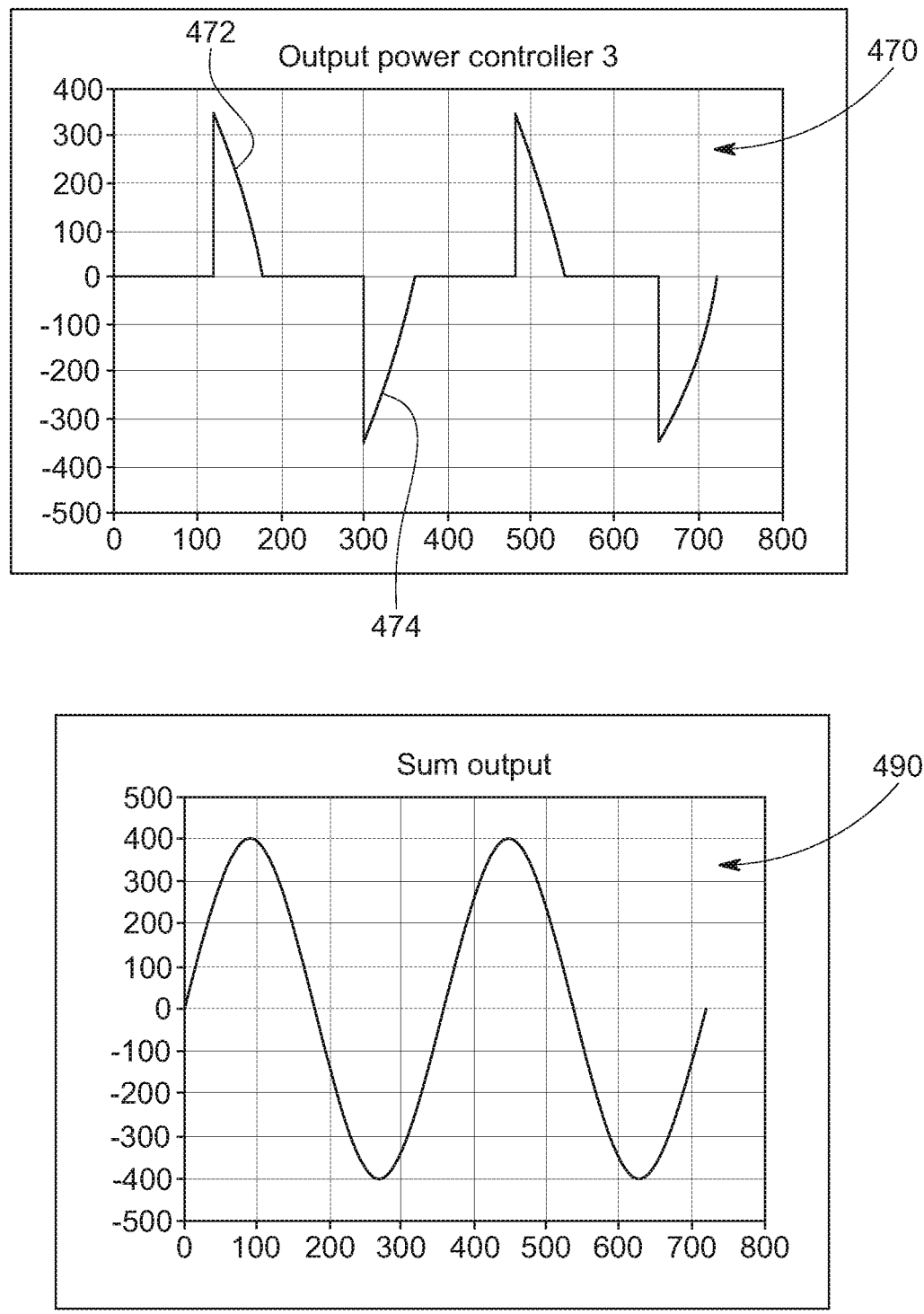
FIG. 4C illustrates additional graphs showing exemplary output waveforms of the power controllers of the power controller system of FIG. 4A, in accordance with aspects of this disclosure.

FIGS. 4A-4C illustrate a power controller system 400 in which the power controllers have an alternative implementation as well as the waveforms generated by those power controllers. In particular, FIG. 4A is a conceptual diagram of an exemplary power controller system 400 having multiple power controllers for controlling power supplied to multiple ohmic loads, in accordance with aspects of this disclosure. Power controller system 400 may be implemented in exemplary thermal system 100 of FIG. 1, for example, in the place of power controller 102. In FIG. 4A, for non-limiting purposes of illustration, three power controllers 420, 440, 460 are shown that respectively control the power applied to three ohmic loads 402, 404, 406. In this regard, FIG. 4A is merely one illustrative example of a power controller system; power controller system 400 may comprise many other numbers of power controllers controlling many other numbers of loads.

Power controller system 400 is configured to conduct alternating current generated by voltage source 410. Voltage source 410 generates alternating current (AC) by periodically reversing the direction of the voltage, which causes the current to also change direction periodically, creating an oscillating current flow. In one implementation, the oscillating current flow generated by AC voltage source 410 has a sinusoidal waveform profile comprised of repeating cycles or periods, with each cycle having a positive half-cycle and a negative half-cycle. One cycle of the sinusoidal waveform generated by AC voltage source 410 may be, for example, a mains period of a residential or commercial power system. The line between voltage source 410 and power controllers 420, 440, 460 may be the L1 line.

As described above, voltage source 410 generates a periodic waveform. While this disclosure often describes the periodic waveform generated by voltage source 410 as a sinusoidal waveform, the periodic waveform could have other shapes. The periodic waveform could be, for example, a square waveform, a triangle waveform, or any other suitably shaped periodic waveform.

As described with reference to FIG. 3, each power controller includes switchable power components that can be switched on and switched off. While FIG. 3 depicted the power controllers in the form of a switch that can be switched on or off at any time and that can conduct current in either a forward or reverse direction when switched on, FIG. 4 depicts another implementation of the power controllers. In particular, each power controller contains a first switchable power component paired with a diode for conducting current in a forward direction (the positive half-cycles of the periodic waveform) and a second switchable power component paired with an oppositely configured diode for conducting current in a reverse direction (the negative half-cycles of the periodic waveform). Thus, switchable power component may be configured to be switched on or off at any time and configured to conduct current in both forward and reverse directions when switched on. First power controller 420 includes switchable power component 422 paired with diode 424 for conducting current in a first (forward) direction when switchable power component 422 is switched on, and switchable power component 426 paired with oppositely configured diode 428 for conducting current in a second (reverse) direction when switchable power component 426 is switched on. Likewise, second power controller 440 includes switchable power component 442 paired with diode 444 and switchable power component 446 paired with diode 448, and third power controller 460 includes switchable power component 462 paired with diode 464 and switchable power component 466 paired with diode 468.

The switchable power components of power controllers 420, 440, 460 may be any suitable power component that can be switched on to allow the flow of current through the device and switched off to prevent the flow of current through the device. As depicted in FIG. 4A, the switchable power components may be current-controlled devices such as bipolar junction transistors (BJTs) that are switched on by applying a small current to the base terminal to allow current to flow between the emitter and collector and that are switched off by removing the base terminal current. Alternatively, the switchable power components may be voltage-controlled devices such as metal-oxide-semiconductor field-effect transistors (MOSFETs) that are switched on by applying a voltage to the gate terminal to allow current to flow between the source and the drain and that are switched off by removing the gate terminal voltage.

The switchable power components within each of power controllers 420, 440, 460 are configured to switch on and switch off at predetermined times within a cycle of the periodic waveform provided by voltage source 410, such that each power controller outputs a partial segment of the cycle of the periodic waveform. That is, power controllers 420, 440, 460 are configured to switch on and switch off at predetermined phase angles of the periodic waveform. Thus, each power controller uses only a partial segment of the periodic waveform, and these partial segments are interleaved in time. Ideally, the output waveforms of power controllers 420, 440, 460 (which are applied individually to ohmic loads 402, 404, 406), when summed, should be approximately equal to the input periodic waveform.

FIGS. 4B and 4C illustrate graphs showing example output waveforms of power controllers 420, 440, 460 of power controller system 400, in accordance with aspects of this disclosure. In the non-limiting example of FIGS. 4A-4C, the periodic waveform input generated by voltage source 410 is a sinusoidal voltage waveform. In the exemplary power controller system 400 of FIG. 4A, the switch on and switch off times of power controllers 420, 440, 460 are staggered and spaced apart by phase angles of sixty degrees. First power controller 420 is set to switch on at the beginning of a waveform cycle, i.e., at a phase angle of 0°, and to switch off at a phase angle of 60°. In particular, switchable power component 422 is switched on at 0° to allow current flow through itself and forward conducting diode 424 until switchable power component 422 is switched off at a phase angle of 60°. The resultant output (at ohmic load 402) is partial segment 432 in the positive half-cycle of output waveform 430 of first power controller 420.

Second power controller 440 is set to switch on when first power controller 420 switches off, i.e., at a phase angle of 60°, and to switch off at 120°. In particular, switchable power component 442 is switched on at a phase angle of 60° to allow current flow through itself and forward conducting diode 444 until switchable power component 442 is switched off at a phase angle of 120°. The resultant output (at ohmic load 404) is partial segment 452 in the positive half-cycle of output waveform 450 of second power controller 440.

Third power controller 460 is set to switch on when second power controller 440 switches off, i.e., at a phase angle of 120°, and to switch off at 180°. In particular, switchable power component 462 is switched on at a phase angle of 120° to allow current to flow through itself and forward conducting diode 464 until switchable power component 462 is switched off at a phase angle of 180°. The resultant output (at ohmic load 406) is partial segment 472 in the positive half-cycle of output waveform 470 of third power controller 460.

The negative half-cycle output waveforms of power controllers 420, 440, 460 are formed in similar fashion. First power controller 420 is set to switch on when third power controller 460 switches off, i.e., at a phase angle of 180°, and to switch off at a phase angle of 240°. In particular, switchable power component 426 is switched on at a phase angle of 180° to allow current flow through itself and reverse conducting diode 428 until switchable power component 426 is switched off at a phase angle of 240°. The resultant output (at ohmic load 402) is partial segment 434 in the negative half-cycle of output waveform 430 of first power controller 420.

Second power controller 440 is set to switch on when first power controller 420 switches off, i.e., at a phase angle of 240°, and to switch off at 300°. In particular, switchable power component 446 is switched on at a phase angle of 240° to allow current to flow through itself and reverse conducting diode 448 until switchable power component 446 is switched off at a phase angle of 300°. The resultant output (at ohmic load 404) is partial segment 454 in the negative half-cycle of output waveform 450 of second power controller 440.

Third power controller 460 is set to switch on when second power controller 440 switches off, i.e., at a phase angle of 300°, and to switch off at 3600 (the end of the cycle). In particular, switchable power component 466 is switched on at a phase angle of 300° to allow current to flow through itself and reverse conducting diode 468 until switchable power component 466 is switched off at a phase angle of 360°. The resultant output (at ohmic load 406) is partial segment 474 in the negative half-cycle of output waveform 470 of third power controller 460.

The total output of power controllers 420, 440, 460, when summed at 480, is a complete sinusoidal voltage waveform 490 that is approximately the same as the input sinusoidal waveform generate by voltage source 410.

Control of the switch-on and switch-off times of the power controllers may be carried out by a separate device, such as control circuitry 482. Control circuitry 482 coordinates (e.g., to optimize) the switch-on and switch-off times so that the combined output of the power controllers is a complete sinusoidal waveform with a reduced amount (e.g., minimal) harmonics, spikes, or other disturbances. In this regard, the summed outputs 480 of power controllers 420, 440, 460 may be fed back to control circuitry 482 to further optimize the switch-on and switch-off times of the power controllers. Alternatively, provided there is a connection 484 between power controllers 420, 440, 460, the switch-on and switch-off times may be controlled by control circuitry within the power controllers themselves without the need for a separate component such as control circuitry 482.

In many practical applications, the loads being supplied by the power controllers are often not pure ohmic loads. Rather, the loads are ohmic-inductive loads having an inductive component as well as an ohmic component. Examples of inductive loads include electric motors, transformers, and fluorescent lights. An ohmic-inductive load is a combination of both types of loads.

Figure 5A:
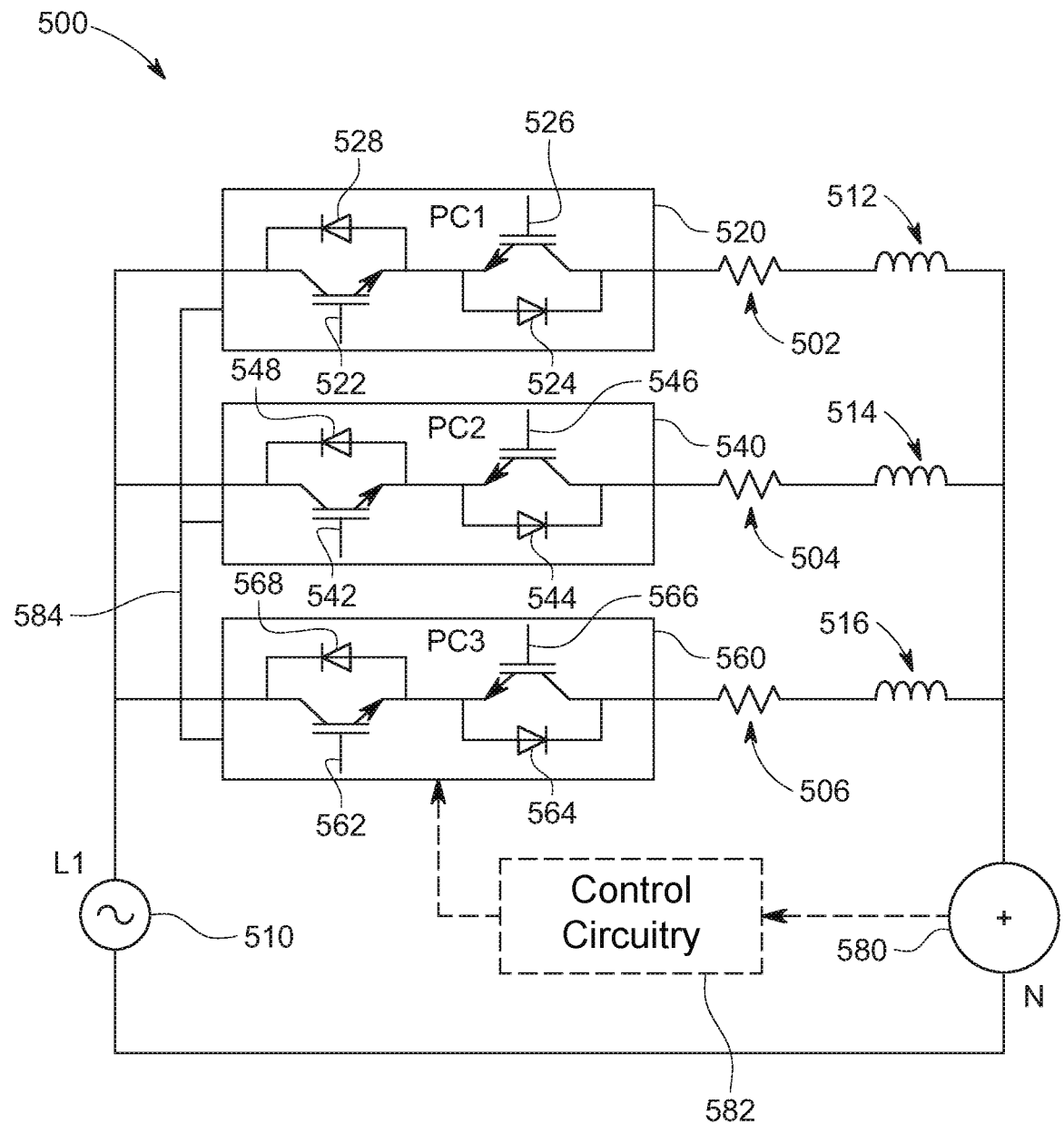
FIG. 5A is a conceptual diagram of an exemplary power controller system having multiple power controllers for controlling power supplied to multiple ohmic-inductive loads, in accordance with aspects of this disclosure.

FIG. 5A is a conceptual diagram of an exemplary power controller system 500 having multiple power controllers for controlling power supplied to multiple ohmic-inductive loads, in accordance with aspects of this disclosure. Power controller system 500 may be implemented in exemplary thermal system 100 of FIG. 1, for example, in the place of power controller 102. Power controller system 500 comprises power controller 520 that supplies power to an ohmic-inductive load including ohmic component 502 and inductive component 512; power controller 540 that supplies power to an ohmic-inductive load including ohmic component 504 and inductive component 514; and power controller 560 that supplies power to an ohmic-inductive load including ohmic component 506 and inductive component 516. Power controller system 500 may also power ohmic-capacitive loads, with similar considerations as discussed below. While FIG. 5A depicts three power controllers 520, 540, 560 that control the power applied to three ohmic-inductive loads 502/512, 504/514, 506/516, this is merely one illustrative example; power controller system 500 may comprise many other numbers of power controllers controlling many other numbers of loads.

Apart from powering ohmic-inductive loads rather than purely ohmic loads, power controller system 500 operates in a similar fashion as power controller systems 300 and 400. The switchable power components within each of power controllers 520, 540, 560 are configured to switch on and switch off at predetermined times (phase angles) within a cycle of the periodic waveform input provided by voltage source 510, such that each power controller outputs a partial segment of the cycle of the periodic waveform that are interleaved in time. Ideally, the output waveforms of power controllers 520, 540, 560 (which are applied individually to ohmic-inductive loads 502/512, 504/514 and 506/516), when summed at 580, should be approximately equal to the input waveform.

Like the power controllers of system 400, each power controller of system 500 includes a forward conducting switchable power component and diode pair that generates partial segments in the positive half-cycles and a reverse conducting switchable power component and diode pair that generates partial segments in the negative half-cycles. First power controller 520 includes switchable power component 522 paired with forward conducting diode 524 and switchable power component 526 paired with reverse conducting diode 528. Second power controller 540 includes switchable power component 542 paired with forward conducting diode 544 and switchable power component 546 paired with reverse conducting diode 548. Third power controller 560 includes switchable power component 562 paired with forward conducting diode 564 and switchable power component 566 paired with reverse conducting diode 568. The switch-on and switch-off phase angle timings of the power controllers may be controlled by a separate processor or control circuitry 582 or by control circuitry within the power controllers themselves provided there is a connection 584 between the power controllers.

Figure 5B:
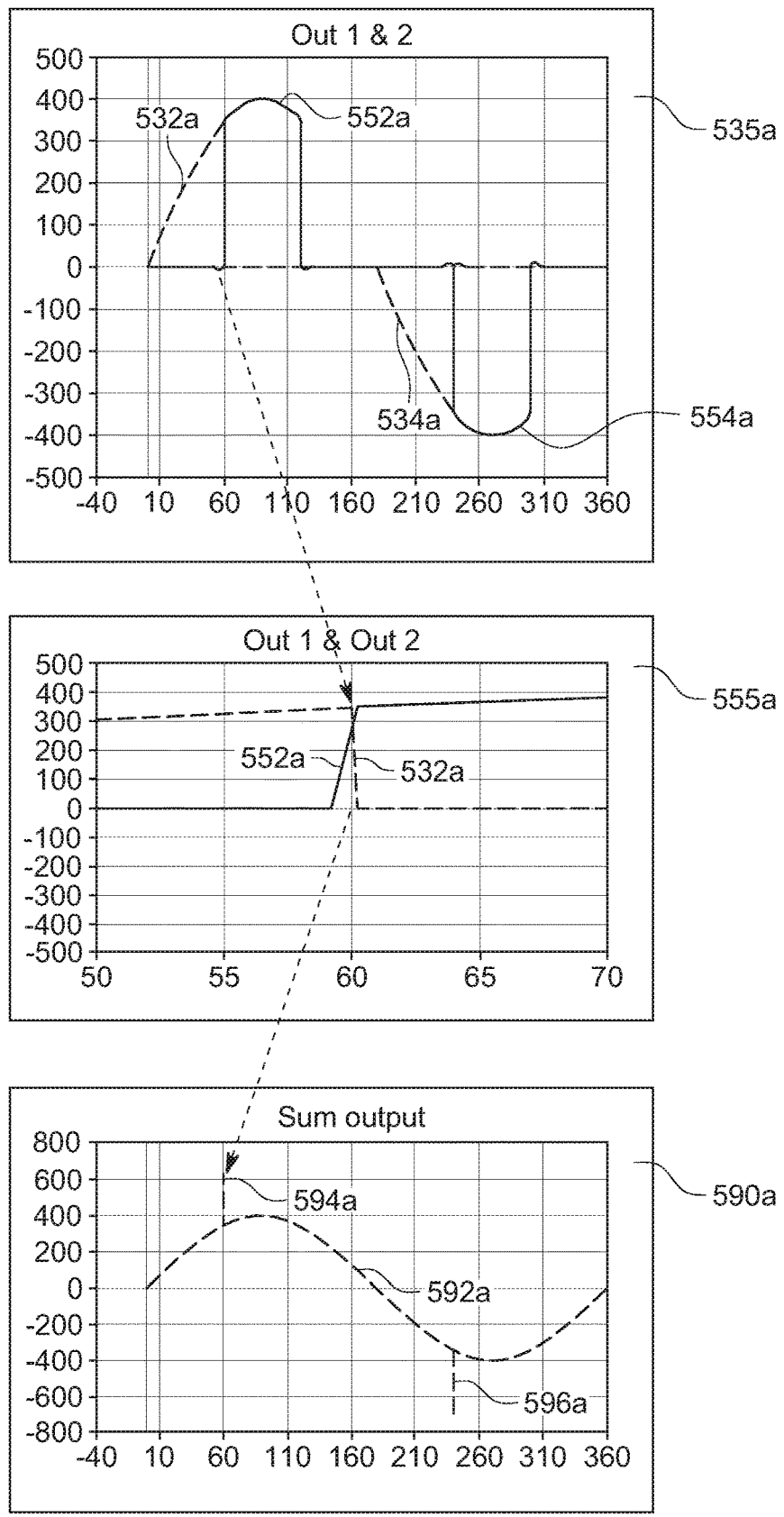
FIG. 5B illustrates graphs showing exemplary output waveforms of the first and second power controllers of the power controller system of FIG. 5A, in accordance with aspects of this disclosure.

FIG. 5B illustrates graphs 535a, 555a, and 590a showing output waveforms of first and second power controllers 520, 540 of power controller system 500, in accordance with aspects of this disclosure. As in power controller system 400 of FIGS. 4A-4C, the switch on and switch off times of power controllers 520, 540, 560 are staggered and spaced apart by phase angles of sixty degrees. First power controller 520 is set to switch on at the beginning of a waveform cycle, i.e., at a phase angle of 0°, and to switch off at a phase angle of 60°. In particular, switchable power component 522 is switched on at 0° to allow current flow through itself and forward conducting diode 524 until switchable power component 522 is switched off at a phase angle of 60°. The resultant output is partial segment 532a in the positive half-cycle of output waveform 535a of the first and second power controllers. In the negative half-cycle, switchable power component 526 is switched on at a phase angle of 180° to allow current flow through itself and reverse conducting diode 528 until switchable power component 526 is switched off at a phase angle of 240°. The resultant output is partial segment 534a in the negative half-cycle of output waveform 535a of the first and second power controllers 520, 540.

Second power controller 540 is set to switch on when first power controller 520 switches off, i.e., at a phase angle of 60°, and to switch off at 120°. In particular, switchable power component 542 is switched on at a phase angle of 60° to allow current flow through itself and forward conducting diode 544 until switchable power component 542 is switched off at a phase angle of 120°. The resultant output is partial segment 552a in the positive half-cycle of output waveform 535a of the first and second power controllers. In the negative half-cycle, switchable power component 546 is switched on at a phase angle of 240° to allow current flow through itself and reverse conducting diode 548 until switchable power component 546 is switched off at a phase angle of 300°. The resultant output is partial segment 554a in the negative half-cycle of output waveform 535a of the first and second power controllers 520, 540.

In like fashion, third power controller 560 switches on at a phase angle of 120° and switches off at 1800 in the positive-half cycle of the waveform and switches on at a phase angle of 300° and switches off at a phase angle of 360° in the negative half-cycle. However, for purposes of illustrating an issue that arises in connection with ohmic-inductive loads, only the output waveforms of first and second power controllers 520 and 540 are shown in graph 535a of FIG. 5B. In particular, because of the presence of inductive loads 512, 514, the output waveforms at the switch-on times and switch-off times of the power controllers are not purely vertical as in the output waveforms for ohmic loads as shown in FIGS. 4B and 4C.

Graph 555a of FIG. 5B is a magnified view of output waveform 532a at the switch-off time of power controller 520 and output waveform 552a at the switch-on time of power controller 540. Because the loads supplied by power controllers 520, 540 are ohmic-inductive loads, output waveform 532a has a downwardly sloping (not purely vertical) form at the switch-off time of power controller 520, and output waveform 552a has an upwardly sloping form at the switch-on time of power controller 540. Output waveforms 532a and 552a cross at a higher voltage level in the slopes of each waveform, causing a spike 594a in the positive half-cycle of the summed output 592a of the waveforms, as shown in graph 590a of FIG. 5B. A spike 596a is similarly formed in the negative half-cycle of the summed output. These spikes are problematic in a similar fashion to harmonic distortion.

To address this issue, the switch-on time of second power controller 540 may be shifted forward (i.e., to be slightly later in time or at a slightly increased phase angle) so that its output waveform crosses the switch-off output waveform of first power controller 520 at a lower voltage level, thereby reducing or eliminating the spike that occurs when the output waveforms are summed. Stated another way, control circuitry may be configured to shift the switch-on and/or switch-off times of the power controllers to mitigate against spikes in the summed output waveform. In this regard, FIG. 5C illustrates graphs 535b, 555b, and 590b showing the output waveforms of first and second power controllers 520, 540 of power controller system 500, with second power controller 540 having a forward-shifted switch-on time, in accordance with aspects of this disclosure.

Figure 5C:
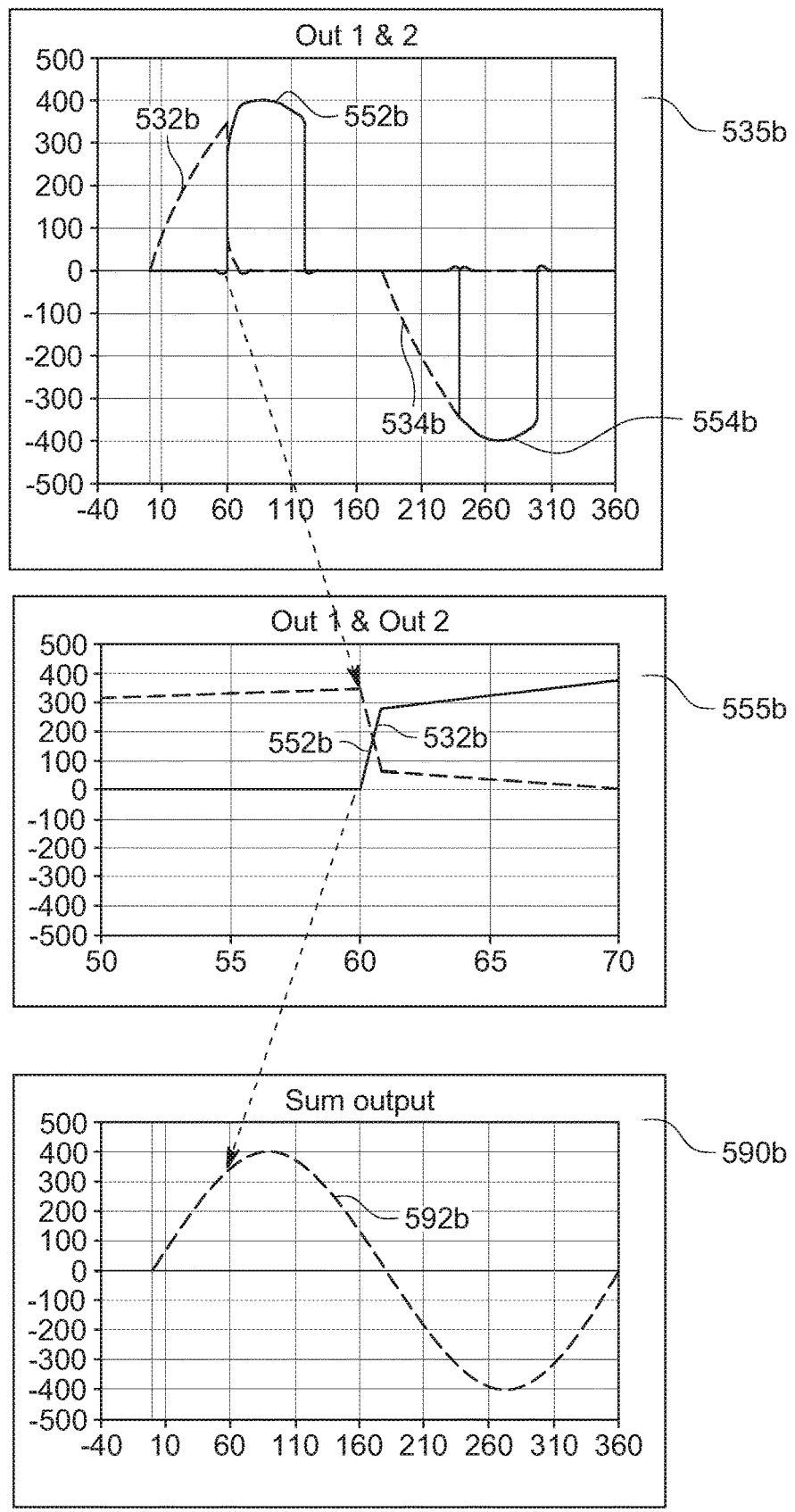
FIG. 5C illustrates graphs showing exemplary output waveforms of the first and second power controllers of the power controller system of FIG. 5A, with the first power controller having a forward-shifted switch-on time, in accordance with aspects of this disclosure.

Graph 535b of FIG. 5C shows output waveforms 532b and 552b of first and second power controllers 520, 540 in the positive-half cycle, and output waveforms 534b and 554b of first and second power controllers 520, 540 in the negative half-cycle. Graph 555b of FIG. 5C is a magnification of the crossing of output waveforms 532b and 552b. Because second power controller 540 has a forward-shifted switch-on time, waveforms 532b and 552b cross at a lower voltage level. As shown in graph 590b, the result is that spikes are eliminated in the summed waveform 592b.

For sake of simplified illustration, the issue (FIG. 5B) and shifting solution (FIG. 5C) in connection with output waveforms for ohmic-inductive loads is only shown for the first and second power controllers. However, the same issue and shifting solution will exist in connection with any output waveforms having the same shift-on and shift-off times (i.e., the summation of the output waveforms for the second and third power controllers, and for the third and first power controllers). This also applies of course to power controller systems having other numbers than three of power controllers. Moreover, rather than forward shifting the switch-on time of the second power controller, a similar effect could be obtained by backward shifting the switch-off time of the first power controller. In other words, rather than switching on the second power controller slightly later or at a slightly larger phase angle, the first power controller could be switched off slightly earlier or at a slightly smaller phase angle.

Figure 6A:
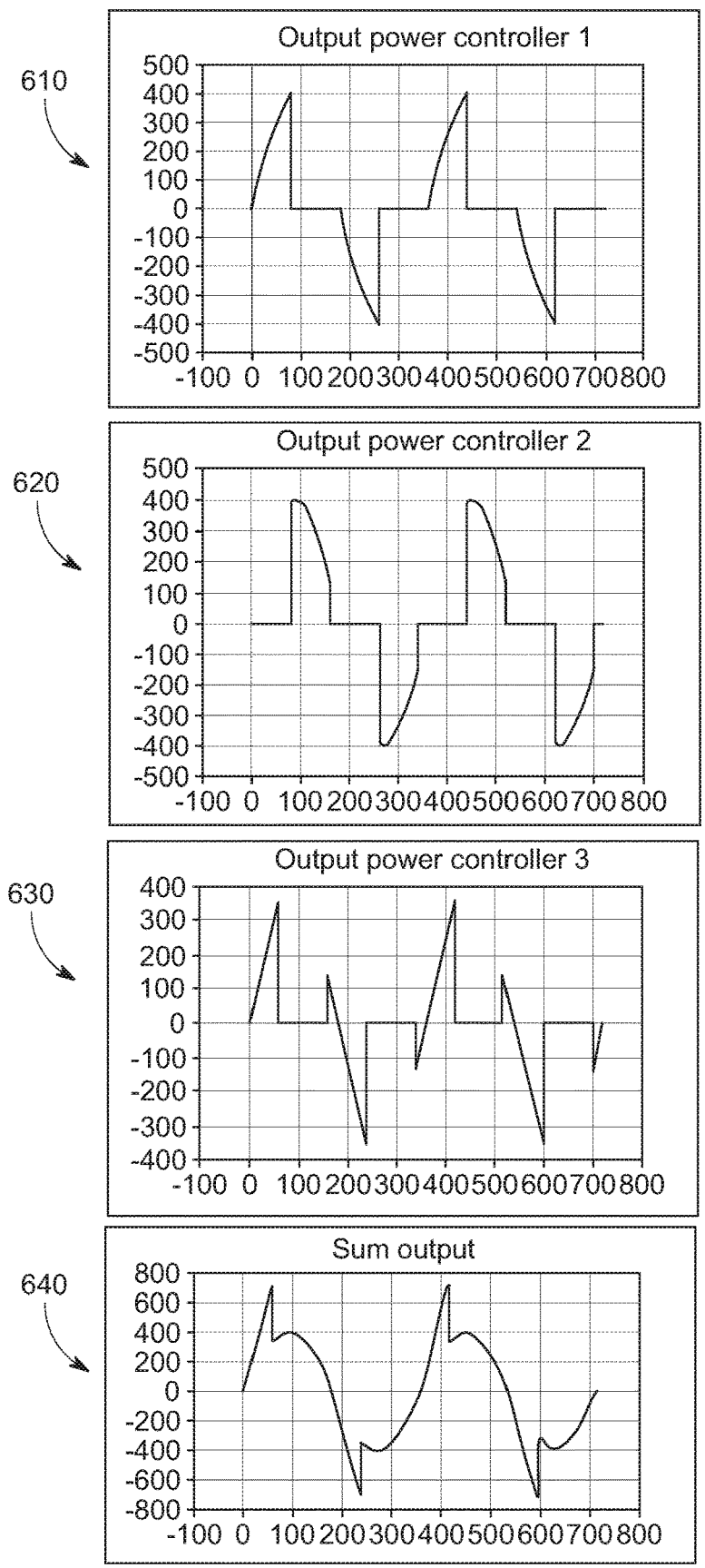
FIG. 6A illustrates graphs of exemplary output waveforms for power controllers with switch-on times set for a duration of 80°, in accordance with aspects of this disclosure.
Figure 6B:
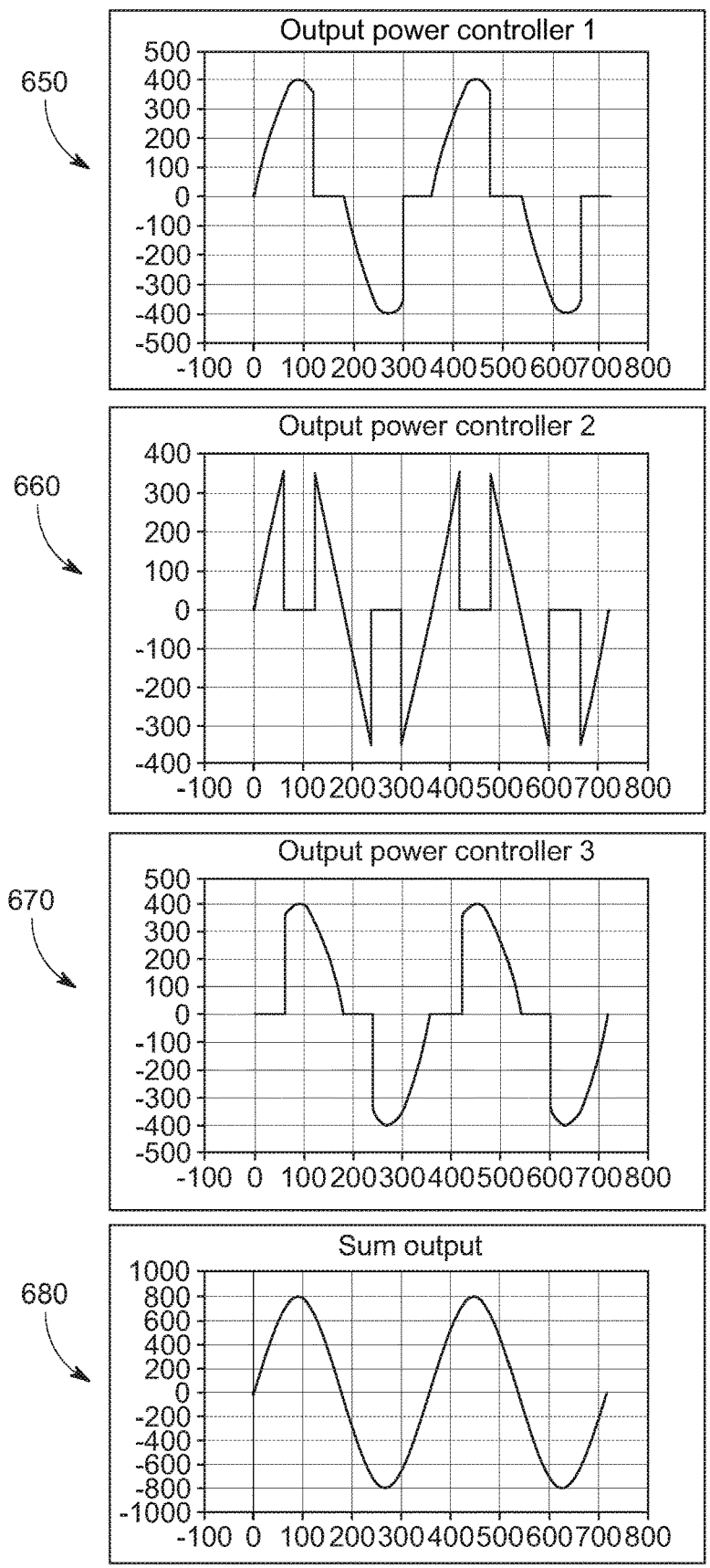
FIG. 6B illustrates graphs of exemplary output waveforms for power controllers with switch-on times set for a duration of 120°, in accordance with aspects of this disclosure.

In the example of FIGS. 5A-5C, the three power controllers each have a switch-on time lasting for 60°, which when summed equals a half-cycle of one mains period. However, as illustrated in FIGS. 6A-6B, different power controller switch-on times may sometimes be required. FIG. 6A illustrates graphs of exemplary output waveforms for power controllers with switch-on times set for a duration of 80°, in accordance with this disclosure. Graph 610 shows the output waveform for the first power controller (switch-on time: 0°; switch-off time: 80°); graph 620 shows the output waveform for the second power controller (switch-on time: 80°; switch-off time: 160°); and graph 630 shows the output waveform for the third power controller (switch-on time 160°; switch-off time 240°). Graph 640 shows the summed output waveform of the three power controllers each having a switch-on time lasting 80°. As can be seen, there is overlap between the summed waveforms, but the slope has a smaller height.

FIG. 6B illustrates graphs of exemplary output waveforms for power controllers with switch-on times set for a duration of 120°, in accordance with this disclosure. Graph 650 shows the output waveform for the first power controller (switch-on time: 0°; switch-off time: 120°); graph 660 shows the output waveform for the second power controller (switch-on time: 120°; switch-off time: 240°); and graph 670 shows the output waveform for the third power controller (switch-on time 240°; switch-off time 360°). Graph 680 shows the summed output waveform of the three power controllers each having a switch-on time lasting 120°. As can be seen, the resultant summed waveform has a total amplitude (peak-to-peak) that is double that of the summed waveform for power controllers having a switch-on time lasting 60°.

As described above, the power controllers may take a range of forms, so long as they incorporate a switchable power component that be switched on or off at any time and that can conduct current in both reverse and forward directions when switched on. In power controller system 300 (FIG. 3), each of the power controllers is configured as a switch that can be switched on or off at any time and that can conduct current in both reverse and forward directions when switched on. In power controller systems 400 and 500 (FIGS. 4 and 5), each of the power controllers is configured as a first switchable power component paired with a first diode for conducting current in a forward direction, and a second switchable power component paired with a second diode for conducting current in a reverse direction.

Figure 6C:
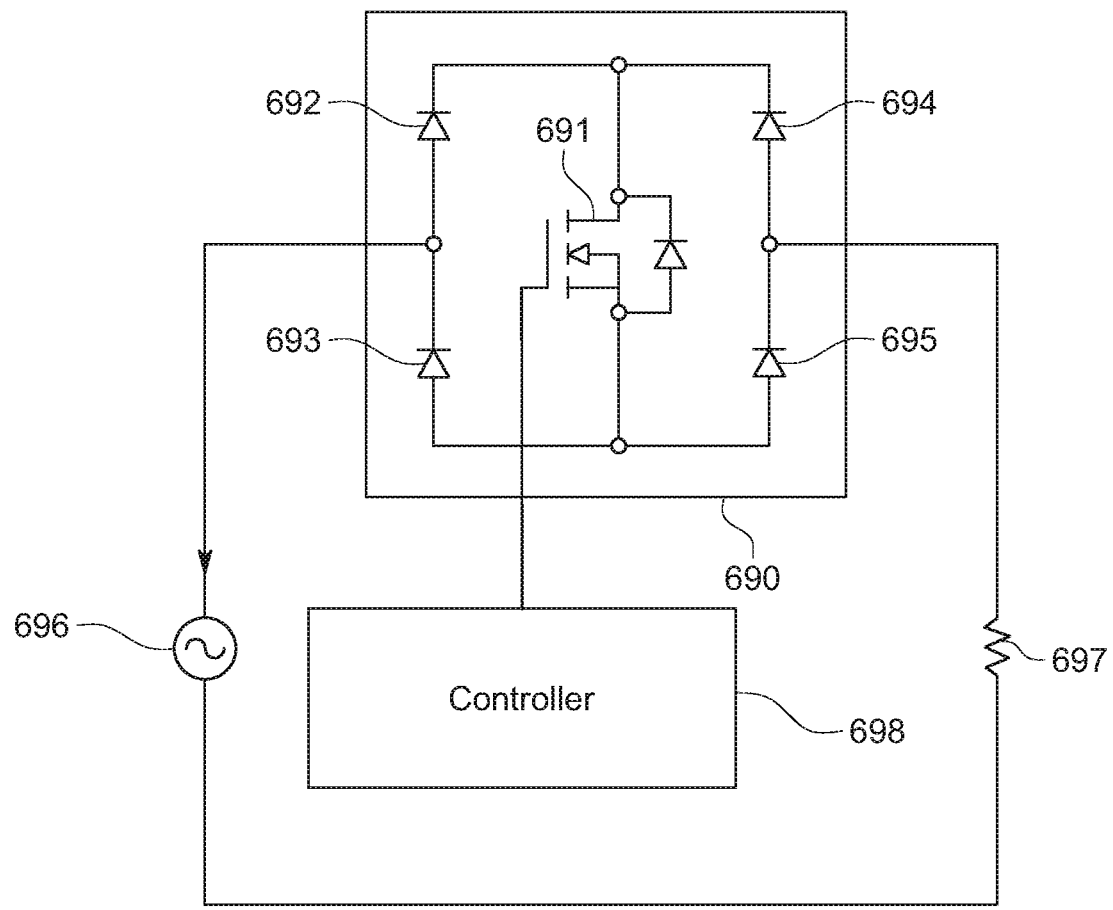
FIG. 6C is a conceptual diagram of an alternative configuration of a power controller, in accordance with aspects of this disclosure.

For purposes of illustrating the variety of forms that each power controller may take, FIG. 6C depicts another exemplary configuration of a power controller 690 comprising a switchable power component 691 coupled to four diodes 692, 693, 694, 695. Power controller 690, for example, may replace the individual control circuitry of any of power controller systems 300 (FIG. 3), 400 (FIG. 4), or 500 (FIG. 5)\

In the example of FIG. 6C, switchable power component 691 comprises a MOSFET with a diode coupled between its drain and source. The drain of switchable power component 691 is coupled to the cathodes of diodes 692 and 694, and the source of power component 691 is coupled to the anodes of diodes 693 and 695. A periodic waveform input is provided by voltage source 696, which is coupled to power controller 690 between the anode of diode 692 and the cathode of diode 693. Based on switch-on and switch-off times set by controller 698 that is coupled to the gate of power component 691, power controller 690 applies a segment of a cycle of the period waveform input to load 697. Although only one power controller 690 is illustrated in FIG. 6C, power controller 690 may be used in combination with other power controllers in similar fashion as shown in FIGS. 3-5.

Figure 7:
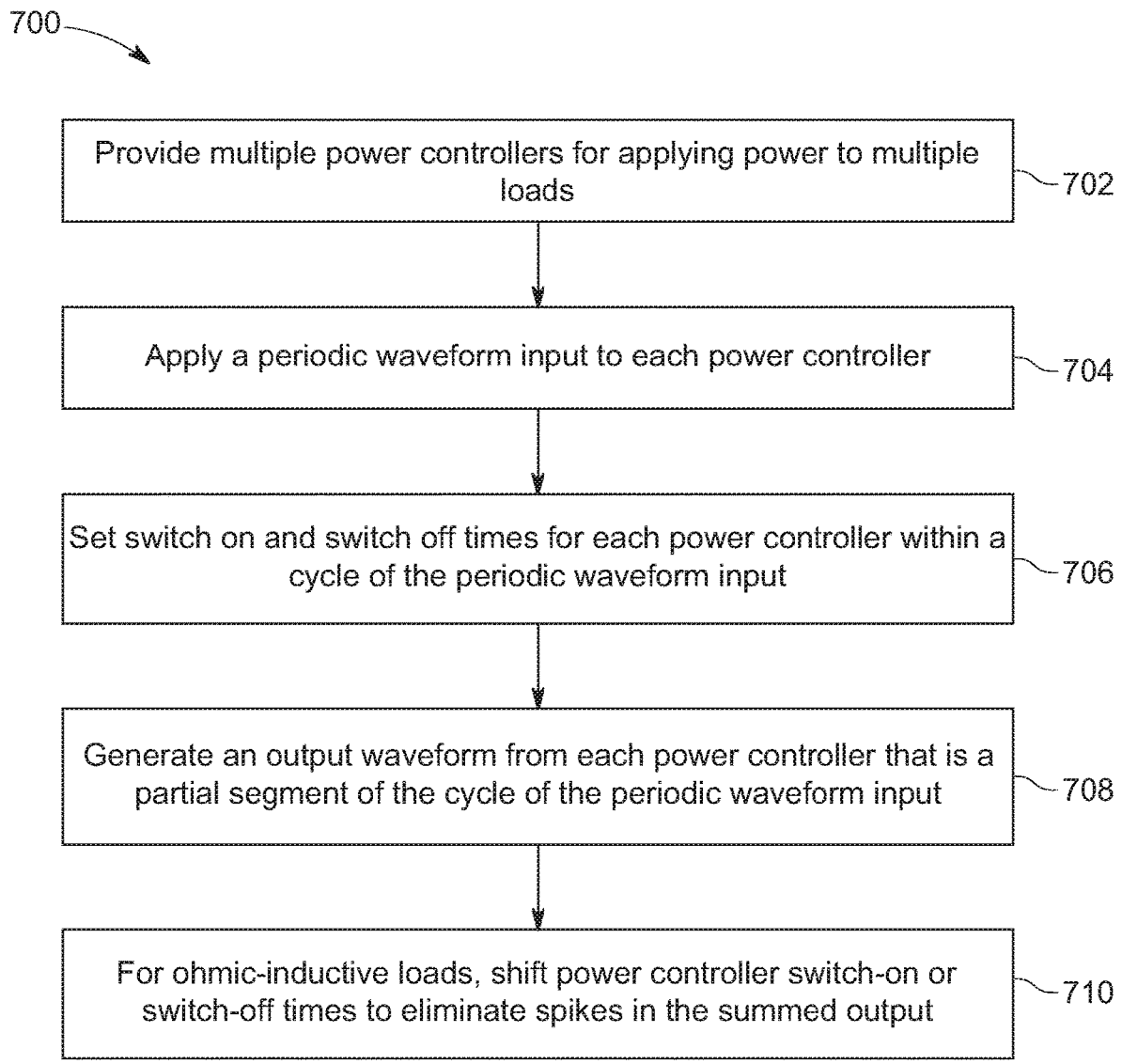
FIG. 7 is a flowchart of a power controller control method, in accordance with aspects of this disclosure.

FIG. 7 is a flowchart of a power controller control method 700, in accordance with aspects of this disclosure. Control method 700 may be implemented, for example, by control circuitry 382 of power controller system 300 (FIG. 3), by control circuitry 482 of power controller system 400 (FIG. 4A), and by control circuitry 582 of power controller system 500 (FIG. 5A). Alternatively, if connections 384/484/584 are provided between the individual power controllers within power controller systems 300/400/500 control method 700 may be implemented by control circuitry (such as a processor-based controller) within the power controllers themselves.

In step 702, multiple power controllers are provided for applying power to multiple loads. In the example of power controllers 300/400, multiple power controllers 320/420, 340/440, 360/460 are provided to apply power to ohmic loads 302/402, 304/404, 306/406. In the example of power controller 500, power controllers 520, 540, 560 are provided to apply power to ohmic-inductive loads 502/512, 504/514, 506/516. As described above, each power controller contains a switchable power component that may be switched on or off at any time and that can conduct current in a forward or reverse direction when switched on. The switchable power components may comprise, for example, BJTs or MOSFETs.

In step 704, a periodic waveform input is applied to each power controller. In power controller systems 300/400/500, for example, a periodic waveform is generated by voltage sources 310/410/510 and applied to the inputs of power controllers 320/420/520, 340/440/540, 360/460/560. In one example, one cycle of the periodic waveform corresponds to a sinusoidal mains period of a residential or commercial power system.

In step 706, switch-on and switch-off times within a cycle of the periodic waveform input are set for each power controller. For example, the switch-on and switch-off times may be staggered such that the power controllers turn on and turn off in sequence within the cycle of the periodic waveform input. In the examples of FIGS. 3-5C, the switch-on and switch-off times are set and staggered such that each power controller is switched on for a duration of 60° (i.e., one-third of a half-cycle of the periodic waveform). Alternatively, as described with reference to FIGS. 6A-6B, the power controllers may be switched on for longer durations than are sufficient for one cycle or period (e.g., 80°, 120°, etc.). Moreover, the wherein the control circuitry may be configured to control (e.g., to optimize) the switch-on and switch-off times of the power controllers by using the summed output waveform as feedback.

In step 708, each power controller generates an output waveform that is a partial segment of the cycle of the periodic waveform input. In power controller system 400, for example, power controller 420 generates output waveform 430; power controller 440 generates output waveform 450; and power controller 460 generates output waveform 470. When these output waveform segments are summed, the resultant summed waveform (i.e., waveform 490) ideally corresponds to the input periodic waveform.

In step 710, where the power controllers are supplying power to ohmic-inductive loads as in power controller system 500, the power controller switch-on and switch-off times are shifted to help avoid spikes in the summed output waveform. As shown in graph 555b of FIG. 5C, for example, the switch-on time of a power controller (i.e., second power controller 540) may be shifted slightly forward in time relative to the switch-off time of the preceding power controller (i.e., first power controller 520). Alternatively, the switch-off time of the preceding power controller could be shifted slightly backward in time relative to the switch-on time of the following power controller.

Those of skill in the art will understand that information and signals may be represented using any of a variety of different technologies and techniques. For example, data, instructions, commands, information, signals, bits, symbols, and chips that are referenced in this description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. For example, the control circuitry 382, 482, 582 may be implemented or performed, at least in part, with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions of the control circuitry 382, 482, 582 described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 8:
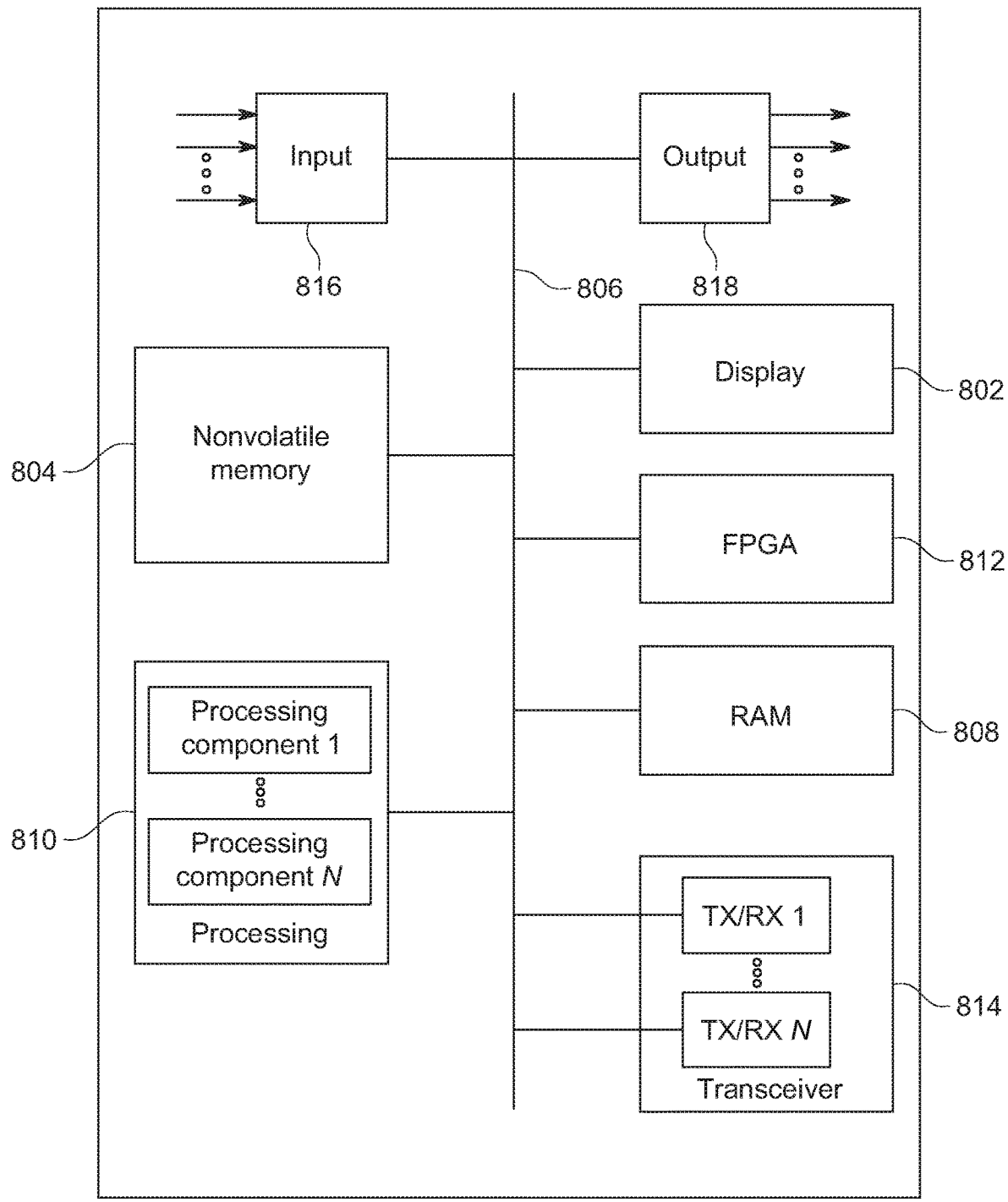
FIG. 8 is a conceptual block diagram depicting a computing system that may be utilized in connection with embodiments disclosed herein.

FIG. 8 is a conceptual diagram of a computing system 800 that may be utilized in connection with the embodiments disclosed herein. For example, the computing system 800 may be used to realize the control circuitry 382, 482, 582 and or controller 698. Display portion 802 and nonvolatile memory 804 are coupled to bus 806 that is also coupled to random access memory (RAM) 808, processing portion 810 that includes N processing components, field programmable gate array (FPGA) 812, and transceiver component 814 that includes N transceivers. Although the components depicted in FIG. 8 represent physical components, FIG. 8 is not intended to be a low-level detailed hardware diagram; thus, many of the components depicted in FIG. 8 may be realized by common constructs or distributed among additional physical components. Moreover, it is contemplated that other existing and yet-to-be developed physical components and architectures may be utilized to implement the functional components described with reference to FIG. 8.

Display portion 802 generally operates to provide a user interface, and in some implementations, is realized by a touchscreen display. Nonvolatile memory 804 is generally a non-transitory processor-readable medium that functions to persistently store data and machine readable (e.g., processor executable) code, including executable code that is associated with effectuating the methods described herein. In some embodiments, nonvolatile memory 804 includes bootloader code, operating system code, file system code, and non-transitory processor-executable code to facilitate execution of the methods described herein including method 700 of FIG. 7.

In some implementations, nonvolatile memory 804 is realized by flash memory (e.g., NAND or ONENAND memory), but it is contemplated that other memory types may be utilized as well. Although it may be possible to execute the code from nonvolatile memory 804, the executable code in nonvolatile memory 804 is typically loaded into RAM 808 and executed by one or more of the N processing components in processing portion 810.

In operation, processing portion 810 in association with RAM 808 may generally operate to execute the instructions stored in nonvolatile memory 804 to realize aspects of this disclosure. For example, non-transitory processor-executable instructions to effectuate aspects of method 700 of FIG. 7 may be persistently stored in nonvolatile memory 804 and executed by processing portion 810 in association with RAM 808. As one of ordinarily skill in the art will appreciate, processing portion 810 may include a video processor, digital signal processor (DSP), graphics processing unit (GPU), and other processing components.

In addition, or in the alternative, FPGA 812 may be configured to effectuate one or more aspects of the methods described herein (e.g., method 700 of FIG. 7). For example, non-transitory FPGA configuration instructions may be persistently stored in nonvolatile memory 804 and accessed by FPGA 812 (e.g., during boot up) to configure FPGA 812 to realize aspects of method 700.

Input component 816 may operate to receive signals (such as feedback 308) that are indicative of one or more aspects of power such as, for example, voltage, current, and/or phase information. Output component 818 generally operates to provide one or more analog or digital signals to effectuate operational aspects of the power controller systems described herein. For example, the output component 818 may produce signals (e.g., electrical and or optical) drive control signals that are used to open and close the switchable power components 322, 342, 362 as is known to those of ordinary skill in the art in view of this disclosure.

Transceiver component 814 includes N transceiver chains, which may be used for communicating with external devices via wireless or wired networks. Each of the N transceiver chains may represent a transceiver associated with a particular communication scheme (e.g., WiFi, Ethernet, Profibus, etc.).

This disclosure is provided to enable any person skilled in the art to make or use the embodiments described herein. Various modifications will be readily apparent to those skilled in the art, and the principles disclosed herein may be applied to other embodiments without departing from the spirit or scope of this disclosure. While certain embodiments are described herein, these embodiments are presented by way of example only and do not limit the scope of this disclosure.

The invention claimed is:

1. A power controller system comprising:
multiple power controllers configured to receive a periodic waveform input and to apply power to multiple loads; and
control circuitry configured to:
set a switch-on time and a switch-off time for each of the power controllers within a cycle of the periodic waveform input;
stagger the switch-on and switch-off times such that the power controllers turn on and turn off in sequence within the cycle of the periodic waveform input;
wherein output waveforms of the power controllers are summed to form a summed output waveform that corresponds to the periodic waveform input, and
wherein each of the power controllers is configured to generate an output waveform that is a partial segment of a cycle of the periodic waveform input; and
wherein each of the each of the power controllers comprises:
a first switchable power component paired with a first diode for conducting current in a forward direction; and
a second switchable power component paired with a second diode for conducting current in a reverse direction.

2. The power controller system of claim 1, wherein each of the power controllers comprises a switchable power component configured to be switched on or off at any time and configured to conduct current in both forward and reverse directions when switched on.

3. The power controller system of claim 1, wherein the control circuitry is configured to optimize the switch-on and switch-off times of the power controllers by using the summed output waveform as feedback.

4. The power controller of claim 3, wherein:
the multiple loads comprise ohmic-inductive loads; and
the control circuitry is configured to shift the switch-on and/or switch-off times of the power controllers to avoid spikes in the summed output waveform.

5. The power controller of claim 1, wherein the control circuitry is configured as a processor that is a separate component from the power controllers.

6. The power controller of claim 1, wherein the power controllers are connected, and wherein the control circuitry is configured within the power controllers.

7. The power controller of claim 1, wherein the periodic waveform input is a sinusoidal mains period of a residential or commercial power system.

8. A power controller control method comprising:
providing multiple power controllers configured to apply power to multiple loads, wherein each of the power controllers comprises a first switchable power component paired with a first diode for conducting current in a forward direction and a second switchable power component paired with a second diode for conducting current in a reverse direction;
applying a periodic waveform input to the power controllers;
setting switch-on and switch-off times for each power controller within a cycle of the periodic waveform input;
staggering the switch-on and switch-off times such that the power controllers turn on and turn off in sequence within the cycle of the periodic waveform input;
summing the waveforms of the power controllers to form a summed output waveform, wherein the summed output waveform corresponds to the periodic waveform input; and
generating output waveforms from the power controllers that are partial segments of the cycle of the periodic waveform input.

9. The power controller control method of claim 8, further comprising:
setting the switch-on and switch-off times by a switchable power component configured to be switched on or off at any time and configured to conduct current in both forward and reverse directions when switched on.

10. The power controller control method of claim 8, further comprising:
optimizing the switch-on and switch-off times of the power controllers by using the summed output waveform as feedback.

11. The power controller control method of claim 8, wherein:
the multiple loads comprise ohmic-inductive loads, and
the switch-on and/or switch-off times of the power controllers are shifted to avoid spikes in the summed output waveform.

12. A non-transitory processor-readable medium encoded with instructions to control a power controller system comprising multiple power controllers, wherein each of the power controllers comprises a first switchable power component paired with a first diode for conducting current in a forward direction and a second switchable power component paired with a second diode for conducting current in a reverse direction, the instructions comprising instructions to:
apply a periodic waveform input to the power controllers;
set switch-on and switch-off times for each power controller within a cycle of the periodic waveform input;
stagger the switch-on and switch-off times such that the power controllers turn on and turn off in sequence within the cycle of the periodic waveform input;
sum output waveforms of the power controllers to form a summed output waveform, wherein the summed output waveform corresponds to the periodic waveform input; and
generate output waveforms from the power controllers that are partial segments of the cycle of the periodic waveform input.

13. The non-transitory processor-readable medium of claim 12, wherein the instructions comprise instructions to:
set the switch-on and switch-off times by a switchable power component configured to be switched on or off at any time and configured to conduct current in both forward and reverse directions when switched on.

* * * * *